US012720507B2

(12) United States Patent
Su et al.

(10) Patent No.: US 12,720,507 B2
(45) Date of Patent: Aug. 25, 2026

(54) RESOURCE DETERMINING METHOD AND APPARATUS

(71) Applicant: HUAWEI TECHNOLOGIES CO., LTD., Shenzhen (CN)

(72) Inventors: Hongjia Su, Shanghai (CN); Lei Dong, Shanghai (CN); Wenting Guo, Shenzhen (CN); Chang He, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 525 days.

(21) Appl. No.: 18/301,069

(22) Filed: Apr. 14, 2023

(65) Prior Publication Data

US 2023/0254831 A1 Aug. 10, 2023

Related U.S. Application Data

(63) Continuation of application No. PCT/CN2020/121592, filed on Oct. 16, 2020.

(51) Int. Cl.
*H04W 72/0446* (2023.01)
*H04W 72/40* (2023.01)

(52) U.S. Cl.
CPC ....... *H04W 72/0446* (2013.01); *H04W 72/40* (2023.01)

(58) Field of Classification Search
CPC . H04W 72/40; H04W 72/0446; H04W 72/52; H04W 72/02; H04W 72/569; Y02D 30/70
See application file for complete search history.

(56) References Cited

U.S. PATENT DOCUMENTS

2018/0359659 A1 12/2018 Cai et al.
2022/0141876 A1 * 5/2022 Gorain ................ H04L 27/2665 370/329

(Continued)

FOREIGN PATENT DOCUMENTS

CN 108024266 A 5/2018
CN 109121214 A 1/2019

(Continued)

OTHER PUBLICATIONS

"Mode 2 resource allocation schemes on sidelink," 3GPP TSG RAN WG1 #98, R1-1908795, Prague, CZ, Total 11 pages, 3rd Generation Partnership Project, Valbonne, France (Aug. 26-30, 2019).

(Continued)

*Primary Examiner* — Brian D Nguyen

(74) *Attorney, Agent, or Firm* — Leydig, Voit & Mayer, Ltd.

(57) ABSTRACT

The present disclosure provides a method, comprising: determining, in a time unit (n), based on at least two resource reservation period parameters $$\{P'_1, P'_2, \ldots, P'_T\},$$

a sensing time unit set corresponding to a candidate time unit ($t_y$), where the candidate time unit ($t_y$) is located in a resource selection window after the time unit (n), and the sensing time unit set is located before the time unit (n); and excluding, based on a sensing result in the sensing time unit set, an unavailable candidate resource unit in the candidate time unit ($t_y$).

20 Claims, 6 Drawing Sheets

500

Determine, in a time unit n based on at least two resource reservation period parameters $\{P'_1, P'_2, \ldots, P'_T\}$, a sensing time unit set corresponding to a candidate time unit $t_y$, where the sensing time unit set includes: $\{\{t_{y-1\times P'_1}, t_{y-2\times P'_1}, \ldots, t_{y-M_1\times P'_1}\}, \{t_{y-1\times P'_2}, t_{y-2\times P'_2}, \ldots, t_{y-M_2\times P'_2}\}, \ldots, \{t_{y-1\times P'_T}, t_{y-2\times P'_T}, \ldots, t_{y-M_T\times P'_T}\}\}$, where $T$ is a positive integer greater than or equal to 2, and $M_1, M_2, \ldots, M_T$ each are a positive integer greater than or equal to 2; and the candidate time unit $t_y$ is located in a resource selection window after the time unit n, and the sensing time unit set is located before the time unit n — 510

Exclude, based on a sensing result in the sensing time unit set, an unavailable candidate resource unit in the candidate time unit $t_y$ — 520

(56) References Cited

U.S. PATENT DOCUMENTS

| | | | | |
|---|---|---|---|---|
| 2022/0386284 A1* | 12/2022 | Zhao | H04W 72/02 | |
| 2023/0126112 A1* | 4/2023 | Lin | H04W 72/02 | 370/329 |
| 2023/0142670 A1* | 5/2023 | Mohammad Soleymani | H04W 72/02 | 370/329 |
| 2023/0164637 A1* | 5/2023 | Zhao | H04W 74/0808 | 370/330 |
| 2023/0247596 A1* | 8/2023 | Selvanesan | H04W 4/44 | 370/329 |
| 2023/0284267 A1* | 9/2023 | Fehrenbach | H04W 74/0808 | 370/329 |
| 2023/0319850 A1* | 10/2023 | Selvanesan | H04W 72/02 | 370/329 |

FOREIGN PATENT DOCUMENTS

| | | |
|---|---|---|
| CN | 111565405 A | 8/2020 |
| WO | 2018201390 A1 | 11/2018 |
| WO | 2019091143 A1 | 5/2019 |
| WO | 2020063578 A1 | 4/2020 |
| WO | 2021184386 A1 | 9/2021 |

OTHER PUBLICATIONS

CATT, "Discussion on shorter resource reservation period in PC5-based V2V," 3GPP TSG RAN WG1 Meeting #88, R1-1702035, Athens, Greece, total 8 pages, 3rd Generation Partnership Project, Valbonne, France (Feb. 13-17, 2017).

"On sidelink mode-2 resource allocation," 3GPP TSG RAN WG1 Meeting #98, R1-1908398, Prague, CZ, total 12 pages, 3rd Generation Partnership Project, Valbonne, France (Aug. 2019).

Huawei et al., "Discussion on measurement requirements for NR V2X," 3GPP TSG-RAN WG4 Meeting #92bis, R4-1911917, Total 3 pages, 3rd Generation Partnership Project, Valbonne, France (Oct. 18, 2019).

Intel Corporation, "Resource Allocation Mode-2 for NR V2X Sidelink Communication," 3GPP TSG RAN WG1 Meeting #98bis, R1-1910650, Total 28 pages, 3rd Generation Partnership Project, Valbonne, France (Oct. 14-20, 2019).

"3rd Generation Partnership Project; Technical Specification Group Radio Access Network; NR; Physical layer procedures for data (Release 16)," 3GPP TS 38.214 V16.3.0, Total 166 pages, 3rd Generation Partnership Project, Valbonne, France (Sep. 2020).

3rd Generation Partnership Project; Technical Specification Group Radio Access Network; NR; Radio Resource Control (RRC) protocol specification (Release 16), 3GPP TS 38.331 V16.2.0, Sep. 2020, Total 921 pages, 3rd Generation Partnership Project, Valbonne, France (Sep. 2020).

Vivo, "Resource allocation for sidelink power saving" [online], 3GPP TSG RAN WG1 #102-e R1-2005403, Aug. 17-28, 2020, total 6 pages.

NTT Docomo, Inc., "Discussion on sidelink resource allocation for power saving[online]", 3GPP TSG RAN WG1 #102-e R1-2006747, Aug. 17-28, 2020, total 6 pages.

Spreadtrum Communications—"Discussion on sidelink resource allocation for power saving[online]", 3GPP TSG RAN WG1 #102-e R1-2006267, Aug. 17-28, 2020, total 3 pages.

Moderator (Intel Corporation), "Outcome and TPs from email discussion [102-e-NR-5G_V2X_NRSL-Mode-2-03]," 3GPP TSG RAN WG1 Meeting #102-E, e-Meeting, R1-2007221, XP052348589, Total 18 pages, 3rd Generation Partnership Project, Valbonne, France (Aug. 17-28, 2020).

* cited by examiner

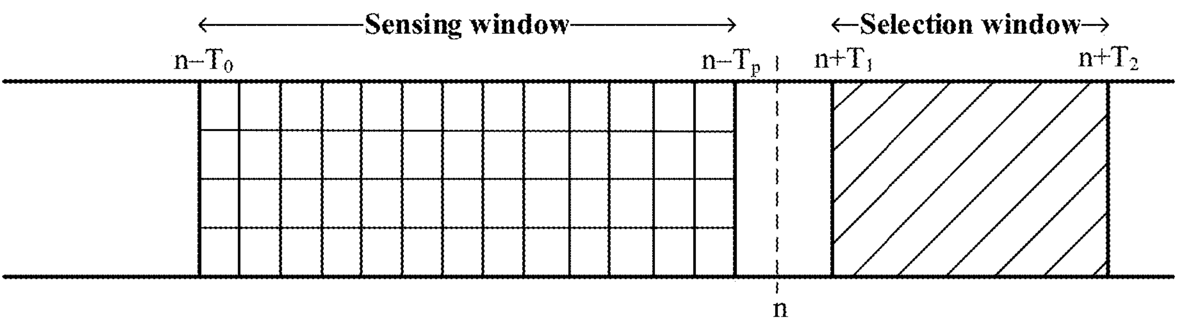

FIG. 3

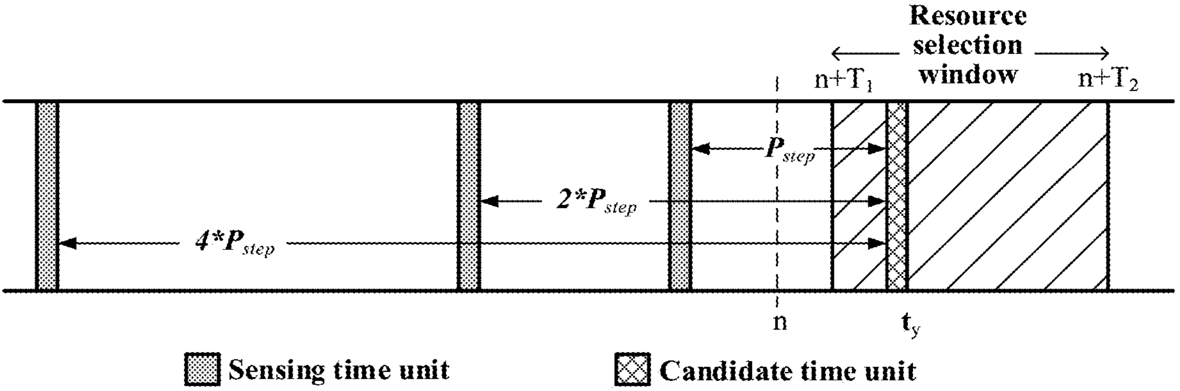

FIG. 4

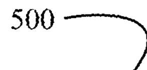

Determine, in a time unit n based on at least two resource reservation period parameters $\{P_1', P_2', \ldots, P_T'\}$, a sensing time unit set corresponding to a candidate time unit $t_y$, where the sensing time unit set includes: $\{\{t_{y-1\times P_1'}, t_{y-2\times P_1'}, \ldots, t_{y-M_1\times P_1'}\}, \{t_{y-1\times P_2'}, t_{y-2\times P_2'}, \ldots, t_{y-M_2\times P_2'}\}, \ldots, \{t_{y-1\times P_T'}, t_{y-2\times P_T'}, \ldots, t_{y-M_T\times P_T'}\}\}$, where $T$ is a positive integer greater than or equal to 2, and $M_1, M_2, \ldots, M_T$ each are a positive integer greater than or equal to 2; and the candidate time unit $t_y$ is located in a resource selection window after the time unit n, and the sensing time unit set is located before the time unit n — 510

Exclude, based on a sensing result in the sensing time unit set, an unavailable candidate resource unit in the candidate time unit $t_y$ — 520

Determine, in a time unit n based on at least one resource reservation period parameter $\{P_1', P_2', \ldots, P_T'\}$, a sensing time unit set corresponding to a candidate time unit $t_y$, where the sensing time unit set includes: a first set $\left\{\{t_{y-1\times P_1'}, t_{y-2\times P_1'}, \ldots, t_{y-M_1\times P_1'}\}, \{t_{y-1\times P_2'}, t_{y-2\times P_2'}, \ldots, t_{y-M_2\times P_2'}\}, \ldots, \{t_{y-1\times P_T'}, t_{y-2\times P_T'}, \ldots, t_{y-M_T\times P_T'}\}\right\}$, and $K_i$ time units in an interval $(t_{y-j_i\times P_i-Q}, t_{y-j_i\times P_i})$ corresponding to each time unit $t_{y-j_i\times P_i}$ in the first set, where $j_i = 1,2,\ldots,M_i$, $i = 1,2,\ldots,T$, $T$ is a positive integer greater than or equal to 1, $Q$ is a positive integer greater than or equal to 1, and for $i$=1, 2, ..., $T$, $K_i$ is a positive integer greater than or equal to 1; and the candidate time unit $t_y$ is located in a resource selection window after the time unit n, and the sensing time unit set is located before the time unit n — 610

Exclude, based on a sensing result in the sensing time unit set, an unavailable candidate resource unit in the candidate time unit $t_y$ — 620

FIG. 6

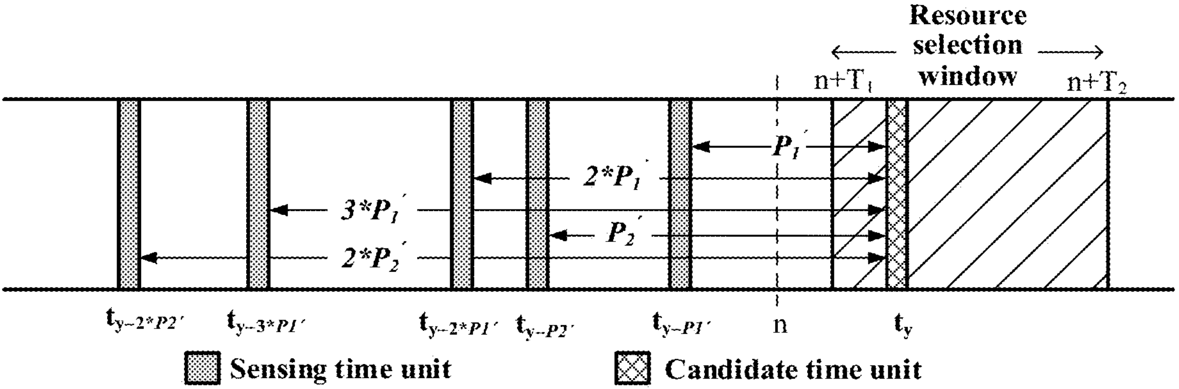

FIG. 7

RESOURCE DETERMINING METHOD AND APPARATUS

CROSS-REFERENCE TO RELATED APPLICATIONS

This application is a continuation of International Application No. PCT/CN2020/121592, filed on Oct. 16, 2020, the disclosure of which is hereby incorporated by reference in its entirety.

FIELD

The present disclosure relates to the communication field, and more specifically, to a resource determining method and apparatus.

BACKGROUND

In a wireless communication network, there is a communication scenario of direct communication or referred to as sidelink communication, for example, vehicle-to-everything (V2X) communication. The V2X communication includes vehicle-to-vehicle (V2V) communication, vehicle-to-pedestrian (V2P) communication, and vehicle-to-infrastructure (V2I) communication, vehicle-to-network (V2N) communication, and the like. V2V means that SL communication is performed between vehicles or vehicle-mounted devices. A vehicle terminal can obtain information such as vehicle speeds, locations, and driving statuses of surrounding vehicles in real time. Vehicles can form an interactive platform to exchange information such as texts, images, and videos in real time. For example, the V2V communication may be applied to avoidance or reduction of traffic accidents, vehicle supervision and management, and the like. V2P means that a vehicle or a vehicle-mounted device performs SL communication with a communication device (such as a mobile phone or a notebook computer) that is carried by a pedestrian or a rider in a handheld manner or another manner. The V2P communication may be applied to avoidance or reduction of traffic accidents, information services, and the like. V2N means that a vehicle-mounted device is connected to a cloud platform by using an access network/core network. The cloud platform exchanges data with a vehicle, stores and processes obtained data, and provides various application services required by the vehicle. The V2N communication may be applied to vehicle navigation, vehicle remote monitoring, emergency rescue, information entertainment services, and the like. V2I means that a vehicle or a vehicle-mounted device performs SL communication with a roadside infrastructure such as a roadside unit (RSU), a smart street lamp, or a traffic camera. The roadside infrastructure may obtain information about a vehicle in a nearby area and release various real-time information. The V2I communication may be mainly applied to real-time information services, vehicle monitoring and management, and non-stop charging.

In sidelink communication, a terminal may receive an indication of a sidelink resource by using a network device, may select a resource from a resource pool based on a sensing mechanism, or may randomly select a resource from a resource pool. An existing sensing method probably cannot satisfy an increasingly complex communication scenario, and cannot ensure communication efficiency and reliability.

SUMMARY

The present disclosure provides a resource determining method and apparatus, to improve communication reliability and communication efficiency.

According to a first aspect, a resource determining method is provided. An execution body of the method may be a terminal or a network device, may be performed by a combined device or component that has a terminal function or a network device function, or may be performed by a communication chip (for example, a processor, a baseband chip, or a chip system) applied to a terminal or a network device. The method includes: determining, in a time unit n based on at least two resource reservation period parameters $\{P'_1, P'_2, \ldots, P'_T\}$, a sensing time unit set corresponding to a candidate time unit $t_y$, where the sensing time unit set includes:

$$\left\{\left\{t_{y-1\times P'_1}, t_{y-2\times P'_1}, \ldots, t_{y-M_1\times P'_1}\right\}, \left\{t_{y-1\times P'_2}, t_{y-2\times P'_2}, \ldots, t_{y-M_2\times P'_2}\right\}, \ldots, \left\{t_{y-1\times P'_T}, t_{y-2\times P'_T}, \ldots, t_{y-M_T\times P'_T}\right\}\right\},$$

where T is a positive integer greater than or equal to 2, parameters $M_1$ to $M_T$ each are a positive integer greater than or equal to 1, and the parameters $M_1$ to $M_T$ are not all equal to 1; and the candidate time unit $t_y$ is located in a resource selection window after the time unit n, and the sensing time unit set is located before the time unit n; and excluding, based on a sensing result in the sensing time unit set, an unavailable candidate resource unit in the candidate time unit $t_y$.

For example, the parameters $M_1$ to $M_T$ are all positive integers greater than or equal to 2. Optionally, each of the parameters $M_1$ to $M_T$ may be 1.

Based on the resource determining method provided in the first aspect, the sensing time unit set corresponding to the candidate time unit $t_y$ is determined based on the at least two resource reservation period parameters, and any resource reservation period parameter may correspond to one or more sensing time units; and an unavailable candidate resource unit is excluded based on a sensing result in the sensing time unit set, thereby satisfying data quality of service (QoS) to some extent while achieving an energy saving objective, so that a plurality of period parameters can be considered more flexibly and more properly, and the sensing time unit set can be determined more flexibly and more properly. When a quantity of sensing time units is small, it can be ensured that a probability of a collision between a sending resource finally determined by the terminal and a sending resource selected by another terminal is low, that is, high reliability is achieved. In other words, communication reliability and communication efficiency are high in a case of energy saving.

According to a second aspect, a resource determining method is provided. An execution body of the method may be a terminal or a network device, may be performed by a combined device or component that has a terminal function or a network device function, or may be performed by a communication chip (for example, a processor, a baseband chip, or a chip system) applied to a terminal or a network device. The method includes: determining, in a time unit n based on at least one resource reservation period parameter $$\{P'_1, P'_2, \ldots, P'_T\},$$

a sensing time unit set corresponding to a candidate time unit $t_y$, where the sensing time unit set includes: a first set $$\{\{t_{y-1\times P'_1}, t_{y-2\times P'_1}, \ldots, t_{y-M_1\times P'_1}\}, \{t_{y-1\times P'_2}, t_{y-2\times P'_2}, \ldots, t_{y-M_2\times P'_2}\}, \ldots, \{t_{y-1\times P'_T}, t_{y-2\times P'_T}, \ldots, t_{y-M_T\times P'_T}\}\},$$

and $K_i$ time units in an interval $(t_{y-j_i\times P_i-Q}, t_{y-j_i\times P_i})$ corresponding to each time unit $t_{y-j_i\times P_i}$ in the first set, where $j_i=1, 2, \ldots, M_i$, $i=1, 2, \ldots, T$, T is a positive integer greater than or equal to 1, Q is a positive integer greater than or equal to 1, for $i=1, 2, \ldots, T$, $K_i$ is a positive integer greater than or equal to 1, and $M_i$ (or represented as $M_1$ to $M_T$) is a positive integer greater than or equal to 1; and the candidate time unit $t_y$ is located in a resource selection window after the time unit n, and the sensing time unit set is located before the time unit n; and excluding, based on a sensing result in the sensing time unit set, an unavailable candidate resource unit in the candidate time unit $t_y$.

Based on the resource determining method provided in the second aspect, the sensing time unit set corresponding to the candidate time unit $t_y$ is determined based on the at least one resource reservation period parameter, where any resource reservation period parameter may correspond to one or more sensing time units, and the sensing time unit set includes the first set and $K_i$ time units in an interval $$(t_{y-j_i\times P'_i-Q}, t_{y-j_i\times P'_i})$$

corresponding to each time unit $$t_{y-j_i\times P'_i}$$

in the first set, which is equivalent to that based on the first set, the determined sensing time unit set further includes one or more time units in a range of Q time units after each time unit in the first set. Based on the method provided in the second aspect, not only the at least one period parameter can be considered more flexibly and more properly, but also an additional aperiodic sensing opportunity can be adaptively added for each period parameter, so that communication reliability and communication efficiency are higher.

With reference to the first aspect or the second aspect, in some implementations, the candidate time unit $t_y$ may be located in a candidate time unit set in a resource selection window, the resource selection window may be represented as $[n+T_1,n+T_2]$, where [A, B] indicates a value range including boundary points A and B, the candidate time unit set is a subset of the resource selection window, that is, includes Y time units in the resource selection window, Y is a positive integer greater than 0, and a value of Y may be determined by the terminal, configured by the network device, or preconfigured. In addition, a minimum value of Y may also be configured by the network device or preconfigured. Optionally, the method described in the first aspect or the second aspect further includes: selecting a candidate time unit set in the resource selection window.

In some implementations of the first aspect or the second aspect, the candidate time unit $t_y$ is any time unit in the resource selection window $[n+T_1,n+T_2]$.

It should be understood that, the resource reservation period parameter $$\{P'_1, P'_2, \ldots, P'_T\}$$

in the first aspect or the second aspect is generally a value in a unit of a logical time unit, that is, one resource reservation period parameter P' indicates a quantity of time units for SL transmission that are included in a period reservation period interval P ms.

With reference to the first aspect or the second aspect, in some implementations, the at least two resource reservation period parameters are preconfigured, or are configured by the network device or another terminal. To be specific, the terminal may directly obtain the at least two resource reservation period parameters in a unit of a logical time unit, without performing conversion.

With reference to the first aspect or the second aspect, in some implementations, the method may further include: converting at least two resource reservation period intervals $$\{P_1, P_2, \ldots, P_T\}$$

to obtain the at least two resource reservation period parameters $$\{P'_1, P'_2, \ldots, P'_T\},$$

where T is a positive integer greater than or equal to 2. The period reservation period interval P is generally a value in a unit of millisecond ms. The terminal may have a plurality of conversion manners. This is not limited in this embodiment of the present disclosure. Optionally, the at least two resource reservation period intervals $\{P_1, P_2, \ldots, P_T\}$ are preconfigured, or the at least two resource reservation period intervals $\{P_1, P_2, \ldots, P_T\}$ are configured by the network device or another terminal.

With reference to the first aspect or the second aspect, in some implementations, values of the parameters $M_1, M_2, \ldots, M_T$ are all equal. In this case, the parameters $M_1, M_2, \ldots, M_T$ in the expression can be replaced with a parameter M. The parameter M is a positive integer greater than or equal to 2. In this implementation, implementation complexity of an execution body can be simplified.

With reference to the first aspect or the second aspect, in some implementations, the parameter M or the parameters $M_1, M_2, \ldots, M_T$ is determined based on one or more of the at least two resource reservation period parameters $$\{P'_1, P'_2, \ldots, P'_T\},$$

or the parameter M (or the parameters $M_1, M_2, \ldots, M_T$) is determined based on one or more of the at least two resource reservation period intervals $\{P_1, P_2, \ldots, P_T\}$. In this implementation, a quantity of sensing time units corresponding to each period may be flexibly determined based on different period parameters, to avoid excessive sensing in some periods, to improve energy saving efficiency. Alternatively, sensing may be performed for a plurality of times in some periods, to improve accuracy of a sensing result and improve transmission reliability.

With reference to the first aspect or the second aspect, in some implementations, the parameters $M_1, M_2, \ldots, M_T$ may be each determined based on a corresponding resource reservation period parameter or a corresponding resource reservation period interval. To be specific, $M_i$ is determined based on $P_i$, where i=1, 2, . . . , T.

With reference to the first aspect or the second aspect, in some implementations, the parameter M or the parameters $M_1, M_2, \ldots, M_T$ is determined based on an energy saving state level. In this implementation, a quantity of sensing time units corresponding to each period may be flexibly determined based on the energy saving level, so that an energy saving requirement can be satisfied while ensuring transmission reliability.

With reference to the first aspect or the second aspect, in some implementations, the parameter M or the parameters $M_1, M_2, \ldots, M_T$ are determined based on a congestion control measurement parameter. The congestion control measurement parameter may reflect a channel congestion degree or an interference level in a communication environment. Optionally, the congestion control measurement parameter may be at least one of a channel busy ratio CBR, a channel occupancy ratio CR, an RSRP measurement parameter, and an RSSI measurement parameter. In this implementation, impact of different channel congestion degrees or interference levels in a communication environment can be flexibly balanced, to determine a quantity of sensing time units corresponding to each period, thereby improving accuracy of a sensing result. For example, when channel congestion is severe or interference is strong, there may be a large quantity of sensing time units; otherwise, there may be a small quantity of sensing time units, so that the determined sensing time unit set is more properly distributed.

With reference to the first aspect or the second aspect, in some implementations, the parameter M or the parameters $M_1, M_2, \ldots, M_T$ is determined based on a priority of to-be-sent sidelink information. In this implementation, different priorities may flexibly affect a quantity of sensing time units. For example, when a priority is high, there may be a large quantity of sensing time units; otherwise, there may be a small quantity of sensing time units, so that an energy saving effect can be improved while ensuring transmission reliability of data with a high priority.

It should be understood that the foregoing plurality of manners of determining the parameter M or the parameters $M_1, M_2, \ldots, M_T$ may be separately implemented, or may be combined. For example, the parameter M or the parameters $M_1, M_2, \ldots, M_T$ may be determined based on one or a combination of at least two resource reservation period parameters, an energy saving state level, a congestion control measurement parameter, and a priority of to-be-sent sidelink information.

With reference to the first aspect or the second aspect, in some implementations, the parameter M or the parameters $M_1, M_2, \ldots, M_T$ may be preconfigured, or the parameter M or the parameters $M_1, M_2, \ldots, M_T$ is configured by the network device or another terminal device. Optionally, the method provided in the first aspect or the second aspect further includes: receiving first configuration signaling from a network device or a terminal, where the first configuration information indicates configuration information of M or $M_1, M_2, \ldots, M_T$. In this implementation, the network device may configure the parameter M or the parameters $M_1, M_2, \ldots, M_T$ based on a status of an entire network, for example, information such as a quantity of users, a geographical location, a priority, and a resource usage, so that sensing time units are distributed more properly.

With reference to the first aspect or the second aspect, in some implementations, the method provided in the first aspect or the second aspect further includes: receiving second configuration signaling from the network device, where the second configuration signaling includes configuration information of a sidelink resource pool. The resource selection window, the sensing time unit set, and the time unit n all belong to a range of the sidelink resource pool. In some possible implementations, the second configuration signaling is further for indicating at least two resource reservation period intervals $\{P_1, P_2, \ldots, P_T\}$ or at least two resource reservation period parameters $$\{P'_1, P'_2, \ldots, P'_T\}.$$

With reference to the first aspect or the second aspect, in some implementations, the method provided in the first aspect or the second aspect further includes: determining, based on a received signal strength indicator RSSI in each time unit in a measurement time window [n−a, n−1], a congestion control parameter corresponding to the time unit n, or determining, based on RSSIs in time units at intervals of K time units in a measurement time window [n−a, n−1], a congestion control parameter corresponding to the time unit n. a is a positive integer greater than or equal to 1, for example, a=100. K is a positive integer greater than 1, and may be configured by the network device, configured by the terminal device, preconfigured, or predefined in a protocol. The RSSI may be measured at intervals of K time units in a plurality of implementations. For example, in an implementation, in a measurement time window [n−a, n−1], measurement is performed once in a time unit n−a, measurement is performed once in a time unit n−a+K, and measurement is performed once in a time unit n−a+2K. The rest may be deduced by analogy. In another optional implementation, a time unit offset $T_{offset}$ relative to a time unit n−a is defined, measurement is performed once in a time unit $n-a+T_{offset}$, measurement is performed once in a time unit $n-a+T_{offset}+K$, and measurement is performed once in a time unit $n-a+T_{offset}+2K$. The rest may be deduced by analogy.

According to this implementation, on the premise that an energy saving requirement is satisfied, that is, receiving and measurement are reduced as much as possible, information about the channel congestion degree can still be obtained, and is used in various communication scenarios, thereby improving transmission efficiency.

Optionally, the method provided in the first aspect or the second aspect further includes: determining a sidelink transmission parameter based on the congestion control parameter, and/or determining, based on the congestion control parameter, a transfer mode for sending sidelink data. The transfer mode may include a sensing mode (that is, a full sensing mode), a partial sensing mode, a random resource selection mode, and the like. Optionally, it may be further determined, based on the congestion control parameter, whether to perform re-evaluation or preemption detection for resource selection.

With reference to the first aspect or the second aspect, in some implementations, the RSSI in one time unit is a linear average value of total received powers of sidelink subchannels on N symbols in the time unit, where N is greater than or equal to 1 and less than or equal to a total quantity of symbols for mapping a PSCCH and a PSSCH in the time unit; N is a quantity of symbols for mapping a PSCCH in the time unit; N is determined based on the energy saving state level; N is indicated by the configuration information of the resource pool; or N is predefined.

With reference to the first aspect or the second aspect, in some implementations, different subcarrier spacings correspond to different values of a, and the different values of a are predefined, or are configured by the network device.

According to a third aspect, a congestion control parameter measurement method is provided. An execution body of the method may be a terminal or a network device, may be performed by a combined device or component that has a terminal function or a network device function, or may be performed by a communication chip (for example, a processor, a baseband chip, or a chip system) applied to a terminal or a network device. The method includes: determining, based on a received signal strength indicator RSSI in at least one time unit in a measurement time window [n−a, n−1], a congestion control parameter corresponding to a time unit n, where a is a positive integer greater than 1, and the RSSI in one of the at least one time unit is a linear average value of total received powers of sidelink subchannels on some symbols in the time unit; and determining a sidelink transmission parameter based on the congestion control parameter, and/or determining, based on the congestion control parameter, a transfer mode for sending sidelink data. The transfer mode may include a sensing mode (that is, a full sensing mode), a partial sensing mode, a random resource selection mode, and the like. Optionally, it may be further determined, based on the congestion control parameter, whether to perform re-evaluation or preemption detection for resource selection.

According to this implementation, in a case in which an energy saving requirement is satisfied, that is, receiving and measurement are reduced as much as possible, information about the channel congestion degree is obtained, to determine transmission manners or transmission parameters in different channel congestion degrees, thereby improving transmission efficiency.

With reference to the third aspect, in some implementations of the third aspect, the at least one time unit is all time units in the measurement time window [n−a, n−1], or the at least one time unit is time units at intervals of K time units in the measurement time window [n−a, n−1]. Similarly, for an implementation of time units at intervals of K time units, refer to the descriptions in the first aspect or the second aspect. Details are not described herein again.

With reference to the third aspect, in some implementations of the third aspect, the RSSI in one of the at least one time unit is a linear average value of total received powers of sidelink subchannels on N symbols in the time unit, where N is greater than or equal to 1 and less than or equal to a total quantity of symbols for mapping a PSCCH and a PSSCH in the time unit; N is a quantity of symbols for mapping a PSCCH in the time unit; N is determined based on the energy saving state level; N is indicated by the configuration information of the resource pool; or N is predefined.

According to a fourth aspect, a communication apparatus is provided. The communication apparatus has a function of implementing the method in the first aspect. For beneficial effects, refer to the descriptions in the first aspect. Details are not described herein again. The communication apparatus includes a corresponding module or component configured to perform the foregoing method. The modules included in the apparatus may be implemented by using software and/or hardware. In a possible design, the communication apparatus includes a transceiver module and a processing module, and may implement the method in the first aspect or any possible implementation of the first aspect. For details, refer to detailed descriptions in the method example. Details are not described herein again.

According to a fifth aspect, a communication apparatus is provided. The communication apparatus has a function of implementing the method in the second aspect. For beneficial effects, refer to the descriptions in the second aspect. Details are not described herein again. The communication apparatus includes a corresponding module or component configured to perform the foregoing method. The modules included in the apparatus may be implemented by using software and/or hardware. In a possible design, the communication apparatus includes a transceiver module and a processing module, and may implement the method in the second aspect or any possible implementation of the second aspect. For details, refer to detailed descriptions in the method example. Details are not described herein again.

The communication apparatus in the fourth aspect or the fifth aspect may be a terminal or a network device, a chip applied to a terminal or a network device, or another combined device, component, or the like that can implement a function of the terminal or a function of the network device. When the communication apparatus is a terminal device or a network device, the transceiver module may be a transmitter and a receiver, or an integrated transceiver, and may include an antenna, a radio frequency circuit, and the like. The processing module may be a processor, for example, a baseband chip. When the communication apparatus is a component having a function of the terminal or a function of the network device, the transceiver module may be a radio frequency unit, and the processing module may be a processor. When the communication apparatus is a chip system applied to a terminal or a network device, the transceiver module may be an input/output interface of the chip system, and the processing module may be a processor in the chip system, for example, a central processing unit (CPU).

According to a sixth aspect, a communication apparatus is provided, including one or more processors, where the one or more processors are coupled to a memory, and may be configured to execute a program or instructions in the memory, to enable the apparatus to implement the method according to any one of the foregoing aspects or any possible implementation of the aspect. Optionally, the apparatus further includes one or more memories. Optionally, the apparatus further includes a communication interface, and the processor is coupled to the communication interface.

According to a seventh aspect, a processing apparatus is provided. The processing apparatus includes a processing module and an interface module. For example, the processing apparatus is applied to the foregoing communication apparatus, and is configured to implement a function or a method in any one of the foregoing aspects. The processing apparatus may be, for example, a chip system. In a feasible implementation, the chip system further includes a memory, and the memory is configured to store a program instruction and data that are necessary for implementing functions of the method based on the first aspect.

The chip system in the foregoing aspects may be a system-on-a-chip (SOC), a baseband chip, or the like. The baseband chip may include a processor, a channel encoder, a digital signal processor, a modem, an interface module, and the like.

In a specific implementation process, an input signal received by the input interface may be received and input by, for example, but not limited to, a receiver, a signal output by the output interface may be output to, for example, but not limited to, a transmitter and transmitted by the transmitter, and the input interface and the output interface may be an integrated same interface, where the interface is used as an input interface and an output interface at different moments. Specific implementations of the processor and various interfaces are not limited in this embodiment of the present disclosure.

The memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of the present disclosure.

According to an eighth aspect, the present disclosure provides a computer-readable storage medium. The computer-readable storage medium stores a computer program. When the computer program is run, the method according to any one of the foregoing aspects or any possible implementation of the aspect is implemented.

According to a ninth aspect, a computer program product is provided. The computer program product includes a computer program (which may also be referred to as code or instructions). When the computer program is run, a computer is enabled to perform the method according to any one of the foregoing aspects or any possible implementation of the aspect.

BRIEF DESCRIPTION OF DRAWINGS

FIG. 3 is a schematic diagram of a sensing window and a selection window in a first-type sensing process;

FIG. 4 is a schematic diagram of a sensing time unit in a second-type sensing process;

FIG. 5 is a schematic diagram of a resource determining method according to an embodiment of the present disclosure;

FIG. 6 is a schematic diagram of another resource determining method according to an embodiment of the present disclosure;

FIG. 7 is an example diagram of a sensing time unit set determined based on a method according to an embodiment of the present disclosure;

DESCRIPTION OF EMBODIMENTS

The following describes technical solutions of the present disclosure with reference to accompanying drawings.

A method and an apparatus provided in embodiments of the present disclosure may be applied to various communication systems, for example, a Long Term Evolution (LTE) system, a 5th generation (5G) system, a new radio (NR) system, or another communication system that may appear in the future. For example, the method and the apparatus provided in embodiments of the present disclosure may be applied to communication scenarios of terminal-to-terminal direct communication in various existing or future communication systems, for example, a device-to-device (D2D) communication scenario, a vehicle-to-everything (V2X) communication scenario, and an intelligent vehicle-to-everything communication scenario. In addition, the method and the apparatus may also be applied to a communication scenario of backhaul link transmission between network devices, and the like. This is not limited in the present disclosure.

Figure 1:
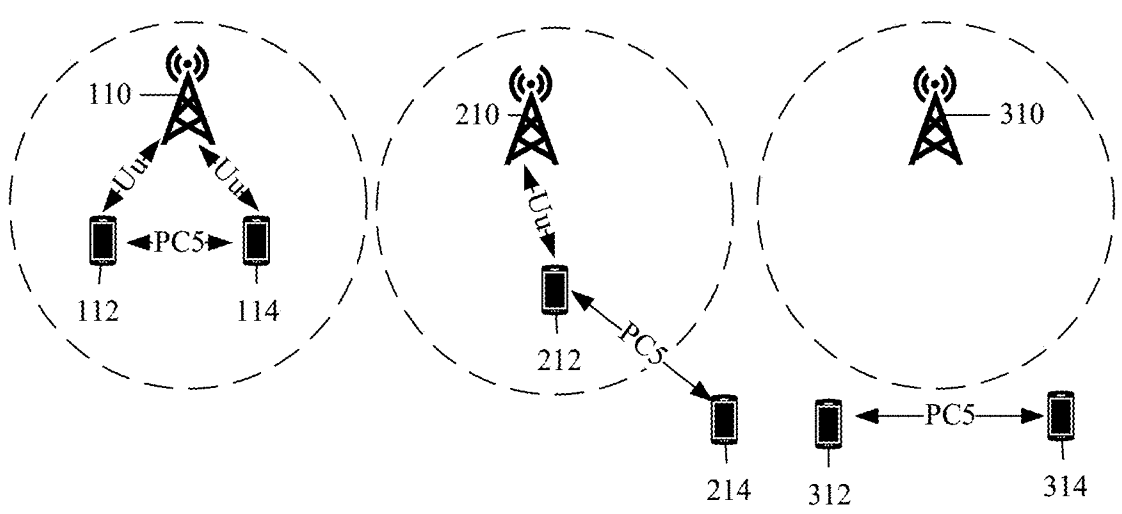
FIG. 1 is a schematic diagram of a structure of a communication system according to an embodiment of the present disclosure.

FIG. 1 is a schematic diagram of a structure of a communication system. The communication system may include one or more network devices (a network device 110, a network device 210, or a network device 310 is shown in the figure), and one or more terminals that communicate with the one or more network devices. In FIG. 1, a terminal 112 and a terminal 114 communicate with the network device 110, a terminal 212 and a terminal 214 communicate with the network device 210, and a terminal 312 and a terminal 314 communicate with the network device 310. It may be understood that the network device and the terminal may also be referred to as communication devices. The terminal and the network device may communicate with each other through a Uu interface. The Uu interface may be understood as a universal interface between the terminal and the network device. Communication through the Uu interface includes uplink transmission and downlink transmission. The terminals may communicate with each other through a PC5 interface. The PC5 interface may be understood as an interface for direct communication between the terminals through a direct channel. In the 3rd Generation Partnership Project (3GPP) radio access network (RAN) protocol, a term sidelink (SL) is usually for indicating direct communication through a PC5 interface. Currently, a concept of the PC5 interface has been extended to communication scenarios that satisfy various market requirements, for example, a communication scenario including a wearable device or a smart appliance. In an LTE network, the PC5 interface supports a scheduled resource allocation mode (e.g., mode 3) and a terminal autonomous resource allocation mode (e.g., mode 4). In addition, in a V2X scenario of a 5G new radio (NR) network, a scheduling-based mode is also referred to as a mode 1, and a terminal-based autonomous mode is also referred to as a mode 2. The method and the apparatus provided in embodiments of the present disclosure are applicable to the inside of coverage of a network device, or applicable to the outside of coverage of a network device. For example, in three possible coverage scenarios shown in FIG. 1, (1) both the terminal 112 and the terminal 114 are located within coverage of the network device 110; (2) the terminal 212 is located within coverage of the network device 210, and the terminal 214 is located outside coverage of the network device 210; and (3) both the terminal 312 and the terminal 314 are located outside coverage of the network device 310. A terminal working in the mode 3 needs to be within coverage of a network device, but a terminal working in the mode 4 may not be within coverage of a network device, or may be within coverage of a network device.

For example, uplink transmission means that a terminal sends uplink information to a network device. The uplink information may include but is not limited to one or more of uplink data information, uplink control information, and a reference signal (RS). A channel for transmitting the uplink information is referred to as an uplink channel, and the uplink channel may be a physical uplink shared channel (PUSCH), a physical uplink control channel (PUCCH), or the like. The PUSCH is for carrying uplink data, and the uplink data may also be referred to as the uplink data information. The PUCCH is for carrying uplink control information (UCI) fed back by the terminal. The UCI may include but is not limited to channel state information (CSI), an acknowledgment (ACK)/negative acknowledgment (NACK), and the like.

For example, downlink transmission means that a network device sends downlink information to a terminal. The downlink information may include but is not limited to one or more of downlink data information, downlink control information, and a downlink reference signal. A channel for transmitting the downlink information is referred to as a downlink channel, and the downlink channel may be a physical downlink shared channel (PDSCH), a physical downlink control channel (PDCCH), or the like. The PDCCH is for carrying downlink control information (DCI). The PDSCH is for carrying downlink data, which may also be referred to as the downlink data information.

For example, channels on the sidelink include but are not limited to one or more of a physical sidelink shared channel (PSSCH), a physical sidelink control channel (PSCCH), a physical sidelink feedback channel (PSFCH), and a physical sidelink discovery channel (PSDCH).

In the present disclosure, the network device may be any device having a wireless transceiver function. The network device includes but is not limited to: an evolved NodeB (NodeB or eNB or e-NodeB) in LTE, a gNodeB (gNB) or a transmission reception point (TRP) in NR, a base station that subsequently evolves in 3GPP, an access node in a Wi-Fi system, a wireless relay node, a wireless backhaul node, a core network device, or the like. A base station may be a macro base station, a micro base station, a picocell base station, a small cell, a relay station, a balloon station, or the like. A plurality of base stations may support the foregoing networks using a same technology, or may support the foregoing networks using different technologies. Alternatively, the network device may be a server (for example, a cloud server), a radio controller in a cloud radio access network (CRAN) scenario, a CU, and/or a DU. Alternatively, the network device may be a server, a wearable device, a machine type communication device, a vehicle-mounted device, a smart screen, or the like. An example in which the network device is a base station is used for description below. The plurality of network devices may be base stations of a same type, or may be base stations of different types. The base station may communicate with a terminal device, or may communicate with a terminal device via a relay station. The terminal device may communicate with a plurality of base stations using different technologies. For example, the terminal device may communicate with a base station supporting an LTE network, or may communicate with a base station supporting a 5G network, or may support dual connections to a base station supporting an LTE network and a base station supporting a 5G network.

The terminal is a device or module having a wireless transceiver function. The terminal may be deployed on land, including an indoor device or an outdoor device, a handheld device, a wearable device, or a vehicle-mounted device; may be deployed on a water surface (for example, a ship); or may be deployed in the air (for example, an airplane, a balloon, or a satellite). The terminal may be a mobile phone (mobile phone), a tablet computer (for example, a Pad), a computer having a wireless transceiver function, a VR terminal device, an AR terminal device, an MR terminal device, a terminal in industrial control, a vehicle terminal device, a terminal in self-driving, a terminal in assisted driving, a terminal in remote medical, a terminal in a smart grid, a terminal in transportation safety, a terminal in a smart city, or a terminal in a smart home. An application scenario is not limited in embodiments of the present disclosure. The terminal may also be sometimes referred to as a terminal device, a terminal apparatus, user equipment (UE), an access terminal device, a vehicle terminal, an industrial control terminal, a UE unit, a UE station, a mobile station, a mobile console, a remote station, a remote terminal device, a mobile device, a UE terminal device, a wireless communication device, a machine terminal, a UE agent, a UE apparatus, or the like. The terminal may be fixed or movable.

By way of example and not limitation, the terminal in the present disclosure may be a wearable device. The wearable device may also be referred to as a wearable intelligent device, and is a general term of a wearable device that is intelligently designed and developed for daily wear by using a wearable technology, for example, glasses, gloves, a watch, clothing, and shoes.

In the present disclosure, the terminal may be a terminal in an internet of things (IoT) system. IoT is an important component in development of future information technologies. A main technical feature of the IoT is to connect an object to a network by using a communication technology, to implement an intelligent network of human-machine interconnection and thing-thing interconnection. The terminal in the present disclosure may be a machine type communication (MTC) terminal. The terminal in the present disclosure may be a vehicle-mounted module, a vehicle-mounted component, a vehicle-mounted chip, or a vehicle-mounted unit that is built in a vehicle as one or more components or units. The vehicle may implement a method in the present disclosure by using the vehicle-mounted module, the vehicle-mounted component, the vehicle-mounted chip, or the vehicle-mounted unit that is built in the vehicle. Therefore, embodiments of the present disclosure may be applied to the internet of vehicles, for example, vehicle-to-everything (V2X), long term evolution-vehicle (LTE-V), and vehicle-to-vehicle (V2V).

Figure 2:
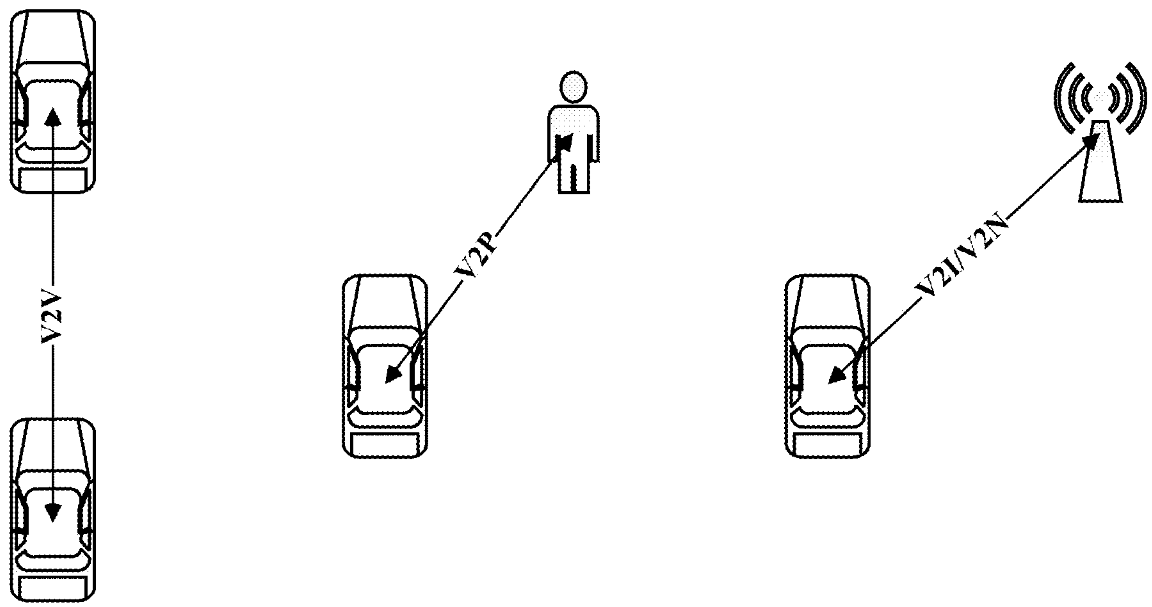
FIG. 2 is a schematic diagram of a V2X communication scenario.

A cellular network-based V2X communication scenario is used as an example. In this case, the terminal may be a vehicle-mounted module, a vehicle-mounted component, a vehicle-mounted chip, or a vehicle-mounted unit for communication that is built in a vehicle. As shown in FIG. 2, V2X communication includes vehicle-to-vehicle ( ) communication, vehicle-to-pedestrian (V2P) communication, vehicle-to-infrastructure (V2I) communication, and vehicle-to-network (V2N) communication. V2V means that SL communication is performed between vehicles or vehicle-mounted devices. A vehicle terminal can obtain information such as vehicle speeds, locations, and driving statuses of surrounding vehicles in real time. Vehicles can form an interactive platform to exchange information such as texts, images, and videos in real time. For example, the V2V communication may be applied to avoidance or reduction of traffic accidents, vehicle supervision and management, and the like. V2P means that a vehicle or a vehicle-mounted device performs SL communication with a communication device (such as a mobile phone or a notebook computer) that is carried by a pedestrian or a rider in a handheld manner or another manner. The V2P communication may be applied to avoidance or reduction of traffic accidents, information services, and the like. V2N means that a vehicle-mounted device is connected to a cloud platform by using an access network/core network. The cloud platform exchanges data with a vehicle, stores and processes obtained data, and provides various application services required by the vehicle. The V2N communication may be applied to vehicle navigation, vehicle remote monitoring, emergency rescue, information entertainment services, and the like. V2I means that a vehicle or a vehicle-mounted device performs SL communication with a roadside infrastructure such as a roadside unit (RSU), a smart street lamp, or a traffic camera. The roadside infrastructure may obtain information about a vehicle in a nearby area and release various real-time information. The V2I communication may be mainly applied to real-time information services, vehicle monitoring and management, and non-stop charging.

An LTE-based V2X communication technology resolves some basic requirements in a vehicle-to-everything scenario, but cannot effectively support future application scenarios such as fully intelligent driving and self-driving. It is expected that a V2X communication technology based on 5G NR or a direct communication technology in any future system can support a lower transmission latency, more reliable communication transmission, a higher throughput, and better user experience, to satisfy requirements of a wider range of application scenarios.

To support communication between terminals, one important issue that needs to be considered is a resource allocation issue of terminal communication. As described above, the PC5 interface between terminals supports two resource allocation modes. One mode is a scheduled resource allocation mode (mode 1 or mode 3). A network device indicates scheduling assignment SA) information and a corresponding communication resource to a sending terminal. The other mode is a terminal autonomous resource allocation mode (mode 2 or mode 4). A sending terminal autonomously selects, from a sidelink resource pool, a resource for sending control information and/or data. The sidelink resource pool may be obtained by the terminal by using resource pool configuration information of a network device, or may be obtained by using preconfiguration information stored in the terminal. The sidelink resource pool is a set of time-frequency resources that can be for sidelink communication. Specifically, in the mode 2 or mode 4, the terminal may select, based on sensing (sensing), a resource for transmission. Generally, an existing sensing process is classified into two types, and the following briefly describes the two types.

It should be understood that "predefinition" described in the present disclosure means that a value or a parameter is defined in a communication protocol, and content defined in a general communication protocol is stored in a baseband chip. "Preconfiguration" described in the present disclosure means to that different values are allowed to be configured for a value or a parameter in a communication protocol, and may be specifically determined based on standards of each country or industry. Therefore, the value or the parameter may have different preconfigured values in each country/region/industry, and a preconfigured value has been preconfigured in a device before delivery.

In a first-type sensing process, in response to a request of a higher layer, the terminal determines, in a time unit n from a sidelink resource pool in a time interval $[n+T_1,n+T_2]$, a resource for transmission. The time interval $[n+T_1,n+T_2]$ may also be referred to as a selection window. The first-type sensing process may generally include the following steps.

(1) The terminal monitors all time units in a time interval $[n-T_0, n-T_p]$ except a time unit in which data of the terminal is transmitted. The time interval $[n-T_0, n-T_p]$ may also be referred to as a sensing window, as shown in FIG. 3. Specifically, the terminal receives sidelink control information (SCI) from another terminal in a sidelink resource pool of the sensing window. For example, a first terminal receives, in a time unit m, SCI from a second terminal, where the SCI includes scheduling information of sidelink data (or referred to as a PSSCH) sent by the second terminal, the SCI further indicates a resource reservation period and a priority of the sidelink data, the resource reservation period is for determining a time-frequency resource reserved by the second terminal, and the SCI may further indicate a time-frequency resource used by the second terminal to retransmit the data. The resource reservation period is configured by the network device or preconfigured. In an implementation, receiving SCI indicates that the first terminal detects and decodes a PSCCH to obtain the SCI. The second terminal is merely an example. The first terminal may receive SCI from different terminals in different time units in the sensing window, depending on an actual application scenario. This is not limited in the present disclosure.

It should be noted that the SCI may indicate a PSSCH resource scheduled in a current time unit, and may further indicate a PSSCH resource reserved in at least one time unit after the current time unit. For example, the SCI sent by the second terminal indicates one PSSCH in the time unit m, and further indicates one reserved PSSCH resource in a time unit (m+3) and another reserved PSSCH resource in a time unit (m+7). In other words, the SCI sent by the second terminal indicates three PSSCH transmission resources in total. The first PSSCH in the three PSSCH resources in a chronological order may be for initial transmission of a data block, and the last two reserved PSSCH resources may be for retransmission of a same data block, or the three PSSCH resources indicated by the SCI are all for retransmission of a data block or are all for initial transmission of different data blocks. This is not limited in the present disclosure. In addition, the time unit (m+3) and the time unit (m+7) are merely used as an example. The SCI sent by the second terminal may indicate only one PSSCH scheduled in the current time unit, and may also indicate only one or more reserved PSSCH time-frequency resources after the current time unit. The first terminal learns, by receiving the SCI, a time-frequency resource occupied and reserved by the second terminal, and selects the resource based on occupancy and reservation statuses of other terminals, to reduce resource collision.

(2) The first terminal determines, based on the received SCI, a PSSCH time-frequency resource reserved by the second terminal, and the first terminal performs, based on the received SCI, measurement on a demodulation reference signal (DMRS) of data or a control channel sent by the second terminal, to obtain reference signal received power (RSRP). If the PSSCH time-frequency resource reserved by the second terminal overlaps one or some candidate resource units in the selection window $[n+T_1,n+T_2]$ of the first terminal, and a related RSRP measurement value is greater than an RSRP threshold $Th_{RSRP}$, the first terminal excludes, from the selection window, the one or some candidate resource units that overlap the PSSCH time-frequency resource, where the RSRP threshold $Th_{RSRP}$ may be predefined in a protocol, configured by a network device, or preconfigured, the candidate resource unit is one time unit in time domain and is L consecutive subchannels in frequency domain, and for the first terminal, any set including L consecutive subchannels that belong to the sidelink resource pool in a time unit and that fall within a range of the selection window is one candidate resource unit, where L is a positive integer greater than or equal to 1. The subchannel described in the present disclosure is a frequency domain unit including several RBs, and a quantity of the RBs included in the subchannel may be configured by the network device or preconfigured.

(3) The first terminal excludes, based on the foregoing example, an unavailable time-frequency resource in the selection window, that is, a time-frequency resource reserved by another terminal, and selects remaining time-frequency resources in the window as available time-frequency resources, and the first terminal reports a set of available time-frequency resources to a higher layer of the terminal. The first terminal further selects, from the available time-frequency resources, a time-frequency resource for sending data.

The terminal determines, based on a sensing result of the terminal in the sensing window $[n-T_0, n-T_p]$, a time-frequency resource for sending sidelink information. In the technical solution provided in this embodiment of the present disclosure, the sensing result is a result determined by performing the foregoing steps (1), (2), and (3). $T_0$, $T_1$, $T_2$, and $T_p$ are all integers greater than or equal to 0, and are in a unit of a time unit. In an implementation, $T_0$ may be a parameter configured by the network device or a preconfigured parameter, and $T_p$ may be determined by the terminal based on a subcarrier spacing. For example, when the subcarrier spacing is 15 kHz, $T_p$ is a length of three time units; when the subcarrier spacing is 30 kHz, $T_p$ is a length of five time units; when the subcarrier spacing is 60 kHz, $T_p$ is a length of eight time units; when the subcarrier spacing is 120 kHz, $T_p$ is a length of 17 time units. $T_1$ and $T_2$ may be determined by the terminal based on an actual situation, and may be related to a processing capability of the terminal and/or a QoS requirement of to-be-sent data.

It should be understood that a high-priority terminal, a high-priority PSSCH, and high-priority data described in the present disclosure all mean that a priority of a PSSCH sent or received by the terminal in a time unit is high. Specifically, the priority of the PSSCH is indicated in the SCI for scheduling the PSSCH. Optionally, a priority level is indicated in the SCI, and a higher priority level indicates a higher QoS requirement of data carried on the PSSCH. Optionally, a priority value is indicated in the SCI, and a smaller priority value indicates a higher corresponding priority level. Certainly, the definition may also be reversed. This is not limited in the present disclosure.

In the foregoing first-type sensing process, the terminal needs to monitor all time units in the sensing window (a time unit used by the terminal to send data may not be monitored). Therefore, the first-type sensing process may be referred to as full sensing, or may be directly referred to as sensing. Unless otherwise specified, a sensing process generally described is generally the first-type sensing process.

In a second-type sensing process, in response to a request of a higher layer, the terminal also determines, in a time unit n from a sidelink resource pool in a selection window $[n+T_1,n+T_2]$, a resource for transmission. A difference from the first-type sensing process lies in that the terminal does not need to monitor all time units in a sensing window. Therefore, the second-type sensing process is usually referred to as partial sensing (partial sensing), and the partial sensing may generally include the following steps.

(1) The terminal selects a candidate sending resource set in the selection window. The candidate sending resource set includes Y time units in the selection window in time domain, and is the same as a PSSCH frequency domain resource (for example, may be at least one subchannel) in frequency domain. Y is a positive integer greater than 0. A value of Y may be determined by the terminal, configured by the network device, or preconfigured. Optionally, a minimum value of Y may be configured by the network device or preconfigured. The candidate sending resource set includes a plurality of candidate resource units. The candidate resource unit is one time unit in time domain and is L consecutive subchannels in frequency domain. For the terminal, any set including L consecutive subchannels that belong to a PSSCH resource pool in one time unit and that fall within a range of the Y time units is one candidate resource unit. L is a positive integer greater than or equal to 1.

(2) The terminal determines, based on time units in the candidate sending resource set, a time unit in which sensing needs to be performed. For example, if a time unit $t_y$ is included in the candidate sending resource set, the terminal needs to monitor a time unit $t_{y-k\times P_{step}}$, and the time unit $t_{y-k\times P_{step}}$ is a sensing time unit corresponding to the partial sensing process. For example, $P_{step}$ may be equal to 100, and a value of k is determined by a bitmap. For example, a length of a bitmap is 10, and when an ith bit of the bitmap is 1, a corresponding value of k includes i, in other words, the bitmap whose length is 10 may indicate one or more values from 1 to 10. For example, if a bitmap is {11010 00000}, and the first bit, the second bit, and the fourth bit of the bitmap are 1, it indicates that time units that correspond to $t_y$ and in which sensing needs to be performed include $t_{y-1\times P_{step}}$, $t_{y-2\times P_{step}}$, and $t_{y-4\times P_{step}}$, as shown in FIG. 4. The bitmap and $P_{step}$ are applicable to any time unit in the candidate sending resource set. Based on the method in the foregoing example, the terminal determines a sensing time unit corresponding to each time unit in the candidate sending resource set, and a set of all corresponding sensing time units may be referred to as a sensing time unit set.

(3) The terminal monitors a time unit in the sensing time unit set, and determines a candidate resource unit that needs to be excluded from the candidate sending resource set. Similar to the first-type sensing process, the partial sensing process also requires PSCCH-based decoding. For example, the terminal needs to decode sidelink control information SCI that is sent by another terminal and that is received in a sensing time unit, and the terminal needs to measure reference signal received power RSRP in the control information and/or data related to the control information. Specifically, if a reserved time-frequency resource indicated by the SCI (for example, a reserved PSSCH time-frequency resource indicated in the SCI) overlaps one or some candidate resource units in the candidate sending resource set, and the RSRP is greater than an RSRP threshold $Th_{RSRP}$, the terminal excludes these candidate resource units from the candidate sending resource set, and these candidate resource units that need to be excluded may be referred to as unavailable candidate resource units. The terminal excludes, based on the foregoing example, an unavailable candidate resource unit in the candidate sending resource set, and remaining time-frequency resources in the candidate sending resource set are available time-frequency resources. The terminal reports a subset of available time-frequency resources to a higher layer of the terminal, and the terminal may further select, from the subset of available time-frequency resources, a time-frequency resource for sending data.

It should be understood that the sensing window or the sensing time unit is located before the current time unit n, and that the terminal monitors these time units in which sensing needs to be performed may be understood as that the terminal detects and buffers, in a historical time unit before the time unit n, information (for example, SCI and/or PSSCH) sent by another terminal, and decodes the previously buffered information and performs corresponding determining and the like when a sending resource needs to be determined.

It should be noted that the time unit described in this embodiment of the present disclosure represents a scheduling unit in time domain, and may be different time domain units in different communication systems or in different application scenarios. For example, the time unit may be a slot, a subframe, a symbol, or a mini-slot, or may be another time domain scheduling unit. This is not limited in this embodiment of the present disclosure.

In an existing partial sensing mechanism, a parameter $P_{step}$ is a fixed value, and the terminal needs to monitor only a time unit that has a fixed period relationship with a time unit in a candidate sending resource set, that is, the foregoing sensing time unit $t_{y-k\times P_{step}}$ (the time unit $t_y$ is included in the candidate sending resource set). Such a correspondence is simple. However, sensing time units determined in the existing partial sensing mechanism are excessively discrete and not flexible enough, and the sensing time units are not distributed randomly enough. In a communication scenario in which data transmission in a large quantity of different periods exists, it cannot be ensured that the terminal properly selects a sending resource. Consequently, a probability of a communication failure caused by a resource collision increases, and overall communication reliability and communication efficiency are reduced. If sensing results in some time units $t_{y-k\times P_{step}}$ are missed or invalid (not available), a final sensing result is severely affected, and consequently a probability of a communication failure caused by a resource collision increases.

Embodiments of the present disclosure provide a resource determining method, to resolve a problem that sensing time units are not properly distributed in the existing partial sensing mechanism, and improve communication reliability and communication efficiency. The following describes embodiments of the present disclosure in detail with reference to the accompanying drawings. The following embodiments and implementations may be combined with each other, and a same or similar concept or process may not be described again in some embodiments. It should be understood that a function explained in the present disclosure may be implemented by using an independent hardware circuit, software running in combination with a processor/microprocessor or a general-purpose computer, an application-specific integrated circuit, and/or one or more modem processors. When described as a method, the present disclosure may alternatively be implemented in a computer processor and a memory coupled to the processor.

FIG. 5 is a schematic flowchart of a resource determining method 500 according to an embodiment of the present disclosure. An execution body of the method 500 may be a terminal, may be performed by a combined device or component that has a terminal function, or may be performed by a communication chip (for example, a processor, a baseband chip, or a chip system) applied to a terminal. An execution body of the method may be a network device, may be performed by a combined device or component that has a network device function, or may be performed by a communication chip (for example, a processor, a baseband chip, or a chip system) applied to a network device. For convenience, the following uses only a terminal as an example for description. As shown in FIG. 5, the method 500 may include part 510 and part 520.

Part 510: Determine, in a time unit n based on at least two resource reservation period parameters $\{P'_1, P'_2, \ldots, P'_T\}$, a sensing time unit set corresponding to a candidate time unit $t_y$, where the sensing time unit set includes:

$$\{\{t_{y-1\times P'_1}, t_{y-2\times P'_1}, \ldots, t_{y-M_1\times P'_1}\}, \{t_{y-1\times P'_2}, t_{y-2\times P'_2}, \ldots, t_{y-M_2\times P'_2}\}, \ldots, \{t_{y-1\times P'_T}, t_{y-2\times P'_T}, \ldots, t_{y-M_T\times P'_T}\}\},$$

where T is a positive integer greater than or equal to 2, parameters $M_1$ to $M_T$ each are a positive integer greater than or equal to 1, and the parameters $M_1$ to $M_T$ are not all equal to 1; and the candidate time unit $t_y$ is located in a resource selection window after the time unit n, and the sensing time unit set is located before the time unit n. For ease of description, $$\{\{t_{y-1\times P'_1}, t_{y-2\times P'_1}, \ldots, t_{y-M_1\times P'_1}\}, \{t_{y-1\times P'_2}, t_{y-2\times P'_2}, \ldots, t_{y-M_2\times P'_2}\}, \ldots, \{t_{y-1\times P'_T}, t_{y-2\times P'_T}, \ldots, t_{y-M_T\times P'_T}\}\}$$

is referred to as a first set below.

In part 510, optionally, each of the parameters $M_1$ to $M_T$ is 1. It should be understood that the parameters $M_1$ to $M_T$ described in the present disclosure may also be represented as parameters $M_i$, where i=1, 2, . . . , T. The expression i=1, 2, . . . , T indicates that values of i include all positive integers from 1 to T. The parameters $M_1$ to $M_T$ are not equal to 1 simultaneously, or may be represented as max $(M_i)>1$, where i=1, 2, . . . , T.

In part 510, the terminal may determine a sending resource starting from the time unit n. In some possible implementations, the time unit n may be a time point at which data arrives at a higher layer, for example, a radio resource control layer (RRC layer) or a media access control layer (MAC layer), may be a time point at which data arrives at a logical link, or may be a time point at which data arrives at a physical layer. This is not limited in the present disclosure.

In part 510, the at least two resource reservation period parameters are represented as $$\{P'_1, P'_2, \ldots, P'_T\},$$

where T is a positive integer greater than or equal to 2. Without loss of generality, T being 2 indicates two resource reservation period parameters $$\{P'_1, P'_2\}.$$

It should be understood that, the part $$\{t_{y-1\times P'_1}, t_{y-2\times P'_1}, \ldots, t_{y-M_1\times P'_1}\}$$

in the expression of the first set described in this embodiment of the present disclosure may also be represented as $$\{t_{y-j_1\times P'_1}\},$$

where $j_1=1, 2, \ldots, M_1$, indicating that $j_1$ is obtained from all positive integers from 1 to $M_1$.

$$\{t_{y-1\times P'_1}, t_{y-2\times P'_1}, \ldots, t_{y-M_1\times P'_1}\}$$

may be understood as that, for the resource reservation period parameter $P'_1$, the sensing time unit corresponding to the candidate time unit $t_y$ includes time units that are at intervals of all positive integer multiples, from 1 to $M_1$, of $P'_1$ from $t_y$ before $t_y$. The foregoing explanation is also applicable to other parts in the first set $$\{\{t_{y-1\times P'_1}, t_{y-2\times P'_1}, \ldots, t_{y-M_1\times P'_1}\}, \{t_{y-1\times P'_2}, t_{y-2\times P'_2}, \ldots, t_{y-M_2\times P'_2}\}, \ldots, \{t_{y-1\times P'_T}, t_{y-2\times P'_T}, \ldots, t_{y-M_T\times P'_T}\}\}.$$

To be specific, any resource reservation period parameter is consistent with the foregoing understanding, and details are not described again.

In addition, curly brackets { } used in embodiments of the present disclosure may represent one element, or may represent a set including two or more elements, and does not include another restrictive meaning. In some implementations, when a value of a parameter in $M_1$ to $M_T$ is 1, for example, when $M_1=1$, $$\{t_{y-1\times P'_1}, t_{y-2\times P'_1}, \ldots, t_{y-M_1\times P'_1}\}$$

is one element $$t_{y-P'_1}.$$

Although $$t_{y-2\times P'_1}$$

is listed in the expression $$\{t_{y-1\times P'_1}, t_{y-2\times P'_1}, \ldots, t_{y-M_1\times P'_1}\},$$

it only indicates that $j_1$ in $$\{t_{y-j_1\times P'_1}\}$$

is obtained from all positive integers from 1 to $M_i$, but it does not indicate that the set or element definitely includes $$t_{y-2\times P'_1}.$$

An element specifically included in the expression $$\{t_{y-1\times P'_1}, t_{y-2\times P'_1}, \ldots, t_{y-M_1\times P'_1}\}$$

depends on a value of $M_1$, and a same principle is applicable to expressions of other parts.

Therefore, the sensing time unit set (the first set) in part 510 may be further represented as:

$$\{\{t_{y-j_1\times P'_1}\}, \{t_{y-j_2\times P'_2}\}, \ldots, \{t_{y-j_T\times P'_T}\}\} \text{ or } \{t_{y-j_i\times P'_i}\},$$

where $j_i=1, 2, \ldots, M_i$, and $i=1, 2, \ldots, T$. Specifically, $i=1, 2, \ldots, T$ represents that i is obtained from all positive integers from 1 to T, $j_i=1, 2, \ldots, M_i$ represents that $j_i$ is obtained from all positive integers from 1 to $M_i$ for any value of $i=1, 2, \ldots, T$, for example, $j_1=1, 2, \ldots, M_1$, $j_2=1, 2, \ldots, M_2, \ldots, j_T=1, 2, \ldots, M_T$, and so on. Therefore, $$\{t_{y-j_1\times P'_1}\}$$

may also be represented as $$\{t_{y-1\times P'_1}, t_{y-2\times P'_1}, \ldots, t_{y-M_1\times P'_1}\}.$$

The foregoing same representation manner is applicable to $$\{t_{y-j_2\times P'_2}\} \text{ or } \{t_{y-j_T\times P'_T}\},$$

are not described again. The foregoing representation manners and explanations are applicable to the descriptions or representations of time unit sets in embodiments of the present disclosure.

FIG. 7 shows a specific example of a sensing time unit set determined based on a method according to an embodiment of the present disclosure. In the example in FIG. 7, at least two resource reservation period parameters include $$\{P'_1, P'_2\}.$$

In addition, if $M_1=3$, and $M_2=2$, sensing time units corresponding to a candidate time unit $t_y$ determined based on $$P'_1$$

and $$P'_2$$

include $$t_{y-1\times P'_1}, t_{y-2\times P'_1}, t_{y-3\times P'_1}, t_{y-1\times P'_2}, \text{ and } t_{y-2\times P'_2},$$

In other words, a sensing time unit set corresponding to the candidate time unit $t_y$ includes $$\{t_{y-1\times P'_1}, t_{y-2\times P'_1}, t_{y-3\times P'_1}, t_{y-1\times P'_2}, t_{y-2\times P'_2}\},$$

and may also be represented as $$\{\{t_{y-1\times P'_1}, t_{y-2\times P'_1}, t_{y-3\times P'_1}\}, \{t_{y-1\times P'_2}, t_{y-2\times P'_2}\}\}.$$

Part 520: Exclude, based on a sensing result in the sensing time unit set, an unavailable candidate resource unit in the candidate time unit $t_y$.

In part 520, specifically, the sensing result may be PSCCH-based decoding and/or received signal strength indicator (RSSI) measurement, which is equivalent to that the terminal needs to decode sidelink control information SCI that is sent by another terminal and that is received in a sensing time unit, and the terminal needs to measure reference signal received power RSRP in the control information and/or data related to the control information. In some possible implementations, if a reserved time-frequency resource indicated by the SCI (for example, a reserved PSSCH time-frequency resource indicated by the SCI) overlaps one or some candidate resource units in a candidate time unit $t_y$, and the RSRP is greater than an RSRP threshold $Th_{RSRP}$, the one or some candidate resource units are unavailable candidate resource units, and then the terminal excludes these candidate resource units in the candidate time unit $t_y$ based on the sensing result. For concepts such as a candidate resource unit and a reserved time-frequency resource, refer to the foregoing descriptions.

In addition, the terminal may alternatively exclude, based on another sensing principle, an unavailable candidate resource unit in the candidate time unit $t_y$. This is not limited in the present disclosure.

In the method 500, optionally, the candidate time unit $t_y$ may be located in a candidate time unit set in a resource selection window, the resource selection window may be represented as $[n+T_1,n+T_2]$, where [A, B] indicates a value range including boundary points A and B, the candidate time unit set is a subset of the resource selection window, that is, includes Y time units in the resource selection window, Y is a positive integer greater than 0, and a value of Y may be determined by the terminal, configured by the network device, or preconfigured. In addition, a minimum value of Y may also be configured by the network device or preconfigured. In some possible implementations, before part 510, the terminal selects a candidate time unit set in the resource selection window, performs, for any candidate time unit in the candidate time unit set, the resource determining method described in part 510 and part 520, and excludes unavailable candidate resource units in all time units in the candidate time unit set, to obtain a set of available resources. The terminal may further select, from the set of available resources, a time-frequency resource for sending data.

In some other possible implementations, the candidate time unit $t_y$ is any time unit in the resource selection window $[n+T_1,n+T_2]$. To be specific, for any candidate time unit in the candidate time unit set, the terminal performs the resource determining method described in part 510 and part 520, and excludes unavailable candidate resource units in all time units in the candidate time unit set, to obtain a set of available resources.

The execution body of the method 500 determines the sensing time unit set corresponding to the candidate time unit $t_y$ based on the at least two resource reservation period parameters, and any resource reservation period parameter may correspond to one or more sensing time units; and an unavailable candidate resource unit is excluded based on a sensing result in the sensing time unit set, thereby satisfying data quality of service (QoS) to some extent while achieving an energy saving objective, so that a plurality of period parameters can be considered more flexibly and more properly, and the sensing time unit set can be determined more flexibly and more properly. When a quantity of sensing time units is small, it can be ensured that a probability of a collision between a sending resource finally determined by the terminal and a sending resource selected by another terminal is low, and higher reliability is achieved. In other words, communication reliability and communication efficiency are high in a case of energy saving.

FIG. 6 is a schematic flowchart of another resource determining method 600 according to an embodiment of the present disclosure. The method 600 and the method 500 may be separately implemented independently, and the method 600 and the method 500 may alternatively be combined. An execution body of the method 600 may be a terminal, may be performed by a combined device or component that has a terminal function, or may be performed by a communication chip (for example, a processor, a baseband chip, or a chip system) applied to a terminal. An execution body of the method 600 may be a network device, may be performed by a combined device or component that has a network device function, or may be performed by a communication chip (for example, a processor, a baseband chip, or a chip system) applied to a network device. Similarly, for convenience, only a terminal is used as an example for description. As shown in FIG. 6, the method 600 may include part 610 and part 620.

Part 610: Determine, in a time unit n based on at least one resource reservation period parameter $$\{P'_1, P'_2, \ldots, P'_T\},$$

a sensing time unit set corresponding to a candidate time unit $t_y$, where the sensing time unit set includes: a first set $$\{\{t_{y-1\times P'_1}, t_{y-2\times P'_1}, \ldots, t_{y-M_1\times P'_1}\}, \{t_{y-1\times P'_2}, t_{y-2\times P'_2}, \ldots, t_{y-M_2\times P'_2}\}, \ldots, \{t_{y-1\times P'_T}, t_{y-2\times P'_T}, \ldots, t_{y-M_T\times P'_T}\}\},$$

and $K_i$ time units in an interval $(t_{y-j_i \times P_i - Q}, t_{y-j_i \times P_i})$ corresponding to each time unit $t_{y-j_i \times P_i}$ in the first set, where $j_i=1, 2, \ldots, M_i$, $i=1, 2, \ldots, T$, T is a positive integer greater than or equal to 1, Q is a positive integer greater than or equal to 1, for $i=1, 2, \ldots, T$, $K_i$ is a positive integer greater than or equal to 1, and $M_1$ to $M_T$ each are a positive integer greater than or equal to 1; and the candidate time unit $t_y$ is located in a resource selection window after the time unit n, and the sensing time unit set is located before the time unit n.

Meanings of expressions and symbols in the method 600 are consistent with those in the description of the method 500, and same or similar content is not described again.

It should be understood that in part 610, the sensing time unit set includes the first set and $K_i$ time units in an interval $$(t_{y-j_i \times P'_i - Q}, t_{y-j_i \times P'_i})$$

corresponding to each time unit $$t_{y-j_i \times P'_i}$$

in the first set, where $j_i=1, 2, \ldots, M_i$, and $i=1, 2, \ldots, T$. (A, B) represents an interval that does not include boundary points A and B. It is equivalent to that, based on the first set, the sensing time unit set determined in the method 600 further includes one or more time units in a range of Q time units after each time unit in the first set. Specifically, for the resource reservation period parameter $P'_1$, corresponding sensing time units include $$\{t_{y-1 \times P'_1}, t_{y-2 \times P'_1}, \ldots, t_{y-M_1 \times P'_1}\},$$

$K_1$ time units in an interval $$(t_{y-1 \times P'_1 - Q}, t_{y-1 \times P'_1}),$$

$K_1$ time units in an interval $$(t_{y-2 \times P'_1 - Q}, t_{y-2 \times P'_1}),$$

and so on, until $K_1$ time units in an interval sensing time units include $$(t_{y-M_1 \times P'_1 - Q}, t_{y-M_1 \times P'_1})$$

For the resource reservation period parameter $P'_2$, corresponding sensing time units include $$\{t_{y-1 \times P'_2}, t_{y-2 \times P'_2}, \ldots, t_{y-M_2 \times P'_2}\},$$

$K_2$ time units in an interval $$(t_{y-1 \times P'_2 - Q}, t_{y-1 \times P'_2}),$$

$K_2$ time units in an interval $$(t_{y-2 \times P'_1 - Q}, t_{y-2 \times P'_1}),$$

and so on, until $K_2$ time units in an interval $$(t_{y-M_2 \times P'_2 - Q}, t_{y-M_2 \times P'_2}).$$

The foregoing correspondence principle may be deduced by analogy for a sensing time unit corresponding to another resource reservation period parameter. A person of ordinary skill in the art may directly understand the sensing time unit set described in part 610.

It should be understood that respective values of the parameters $M_1$ to $M_T$ described in the present disclosure may be independent of each other. In other words, the respective values of the parameters $M_1$ to $M_T$ are irrelevant to each other.

Figure 8:
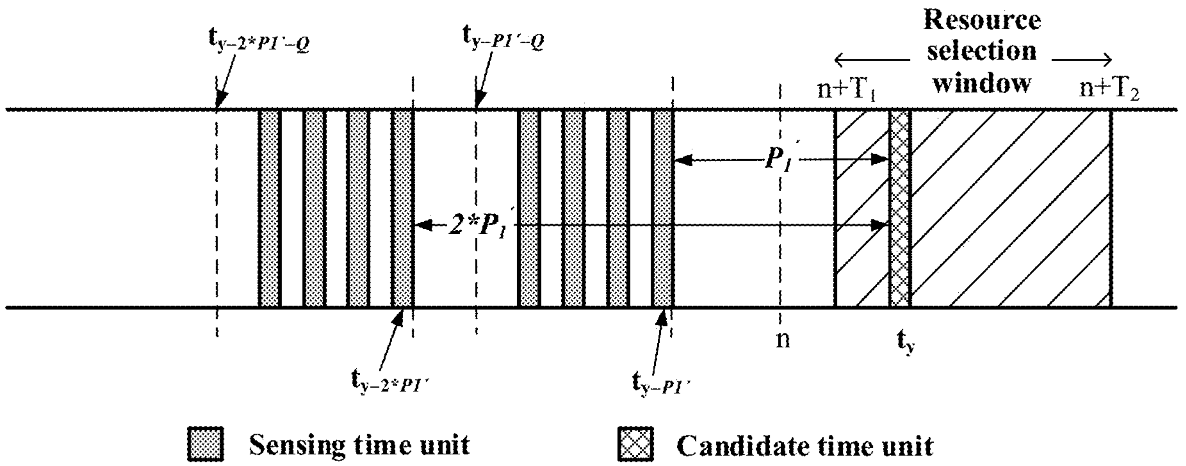
FIG. 8 is an example diagram of another sensing time unit set determined based on a method according to an embodiment of the present disclosure.

FIG. 8 shows a specific example of a sensing time unit set determined based on a method according to an embodiment of the present disclosure. In the example in FIG. 8, at least one resource reservation period parameter includes $$\{P'_1\}.$$

In addition, if $M_1=2$, $Q=5$, and $K_1=3$, sensing time units corresponding to a candidate time unit $t_y$ determined based on $$P'_1$$

include $$t_{y-1 \times P'_1}, t_{y-2 \times P'_1},$$

three time units in an interval $$(t_{y-1 \times P'_1 - Q}, t_{y-1 \times P'_1}),$$

and three time units in an interval $$(t_{y-2 \times P'_1 - Q}, t_{y-2 \times P'_1}).$$

To be specific, the sensing time unit set corresponding to the candidate time unit $t_y$ includes $$\{t_{y-1 \times P'_1}, t_{y-2 \times P'_1}\},$$

three time units in the interval $(t_{y-1\times P'_1-Q}, t_{y-1\times P'_1})$, and three time units in the interval $$\left(t_{y-2\times P'_1-Q},\ t_{y-2\times P'_1}\right).$$

Specific locations of the three time units in each of the two intervals may be randomly determined by the terminal, the three time units in each interval may be consecutive or may be inconsecutive, and respective locations of the three time units in the intervals may be the same or may be different in the intervals.

Figure 9:
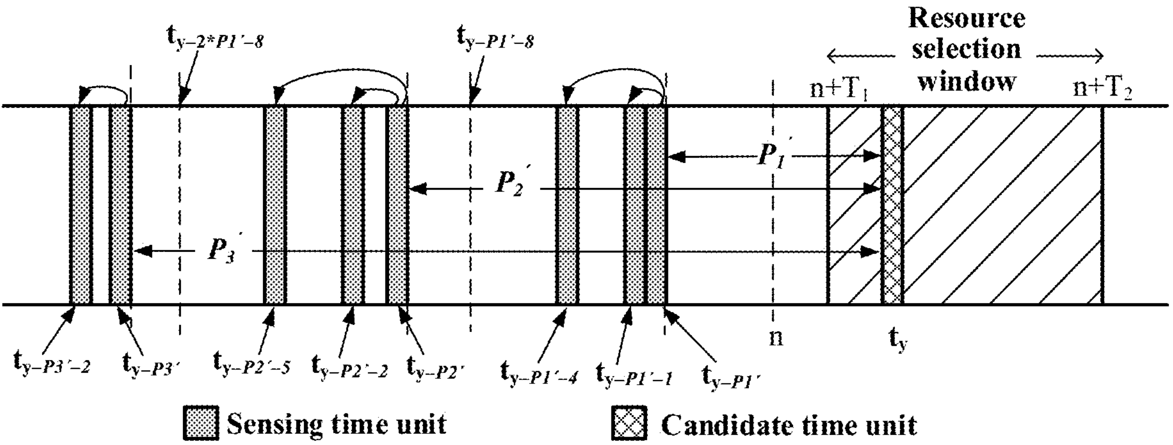
FIG. 9 is an example diagram of still another sensing time unit set determined based on a method according to an embodiment of the present disclosure.

To avoid ambiguity, FIG. 9 shows a specific example of still another sensing time unit set determined based on a method according to an embodiment of the present disclosure. In the example in FIG. 9, at least one resource reservation period parameter includes $$\{P'_1, P'_2, P'_3\}.$$

In addition, if $M_1==M_2=M_3=1$, or M=1, Q=8, $K_1=2$, $K_2=2$, and $K_3=1$, sensing time units corresponding to a candidate time unit $t_y$ determined based on $$P'_1$$

include $$t_{y-1\times P'_1},\ t_{y-1\times P'_2},$$

and $$t_{y-1\times P'_3},$$

two time units in an interval $$\left(t_{y-1\times P'_1-8},\ t_{y-1\times P'_1}\right),$$

two time units in an interval $$\left(t_{y-P'_2-8},\ t_{y-P'_2}\right),$$

and one time unit in an interval $$\left(t_{y-P'_3-8},\ t_{y-P'_3}\right).$$

For example, FIG. 6 provides a specific example. To be specific, the sensing time unit set corresponding to the candidate time unit $t_y$ includes $$\left\{t_{y-P'_1},\ t_{y-P'_2},\ t_{y-P'_3}\right\},$$

two time units $$\left\{t_{y-P'_1-1},\ t_{y-P'_1-4}\right\}$$

in an interval $$\left(t_{y-P'_1-8},\ t_{y-P'_1}\right),$$

two time units $$\left\{t_{y-P'_2-2},\ t_{y-P'_2-5}\right\}$$

in an interval $$\left(t_{y-P'_2-8},\ t_{y-P'_2}\right),$$

and one time unit $$t_{y-P'_3-2}$$

in an interval $$\left(t_{y-P'_3-8},\ t_{y-P'_3}\right).$$

It may be understood that specific locations of the time units in the foregoing three intervals are merely an example, and may be randomly determined by the terminal.

Part 620: Exclude, based on a sensing result in the sensing time unit set, an unavailable candidate resource unit in the candidate time unit $t_y$. Specifically, part 620 may be the same as part 520, and details are not described herein again.

In the method 600, similar to the method 500, the candidate time unit $t_y$ may be located in a candidate time unit set in a resource selection window, the resource selection window may be represented as $[n+T_1,n+T_2]$, where [A, B] indicates a value range including boundary points A and B, the candidate time unit set is a subset of the resource selection window, that is, includes Y time units in the resource selection window, Y is a positive integer greater than 0, and a value of Y may be determined by the terminal, configured by the network device, or preconfigured. In addition, optionally, a minimum value of Y may be configured by the network device or preconfigured. In some implementations, before part 610, the terminal selects a candidate time unit set in the resource selection window, performs, for any candidate time unit in the candidate time unit set, the resource determining method described in part 610 and part 620, and excludes unavailable candidate resource units in all time units in the candidate time unit set, to obtain a set of available resources. The terminal may further select, from the set of available resources, a time-frequency resource for sending data.

In some other implementations, the candidate time unit $t_y$ is any time unit in the resource selection window $[n+T_1, n+T_2]$. To be specific, for any candidate time unit in the candidate time unit set, the terminal performs the resource determining method described in part 610 and part 620, and excludes unavailable candidate resource units in all time units in the candidate time unit set, to obtain a set of available resources.

The execution body of the method 600 determines the sensing time unit set corresponding to the candidate time unit $t_y$ based on the at least one resource reservation period parameter, where any resource reservation period parameter may correspond to one or more sensing time units, and the sensing time unit set includes the first set and $K_i$ time units in an interval $$(t_{y-j_i\times P'_i-Q}, t_{y-j_i\times P'_i})$$

corresponding to each time unit $$t_{y-j_i\times P'_i}$$

in the first set, which is equivalent to that based on the first set, the sensing time unit set determined in the method 600 further includes one or more time units in a range of Q time units after each time unit in the first set. Based on the method 600, not only the at least one period parameter can be considered more flexibly and more properly, but also an additional aperiodic sensing opportunity can be adaptively added for each period parameter, so that communication reliability and communication efficiency are higher.

It should be understood that, the resource reservation period parameter $$\{P'_1, P'_2, \ldots, P'_T\}$$

in the method 500 and the method 600 is generally a value in a unit of a logical time unit, that is, one resource reservation period parameter P' indicates a quantity of time units for SL transmission in one sidelink resource pool that are included in a period reservation period interval P ms.

In a possible implementation, the at least two resource reservation period parameters are preconfigured, or are configured by the network device or another terminal. To be specific, the terminal may directly obtain the at least two resource reservation period parameters in a unit of a logical time unit, without performing conversion.

In another possible implementation, before part 510 and part 610, the method may further include: converting at least two resource reservation period intervals $\{P_1, P_2, \ldots, P_T\}$ to obtain the at least two resource reservation period parameters $$\{P'_1, P'_2, \ldots, P'_T\},$$

where T is a positive integer greater than or equal to 2. The period reservation period interval P is generally a value in a unit of millisecond ms. For example, the terminal may convert each resource reservation period interval based on the following formula: P'=N/20 ms×P, where N is a quantity of time units for SL transmission within 20 ms. The foregoing formula is merely an example, and the terminal may have another conversion manner. This is not limited in this embodiment of the present disclosure. Optionally, the at least two resource reservation period intervals $\{P_1, P_2, \ldots, P_T\}$ are preconfigured, or the at least two resource reservation period intervals $\{P_1, P_2, \ldots, P_T\}$ are configured by the network device or another terminal.

In the method 500 and the method 600, optionally, values of the parameters $M_1, M_2, \ldots, M_T$ are all equal. In this case, the parameters $M_1, M_2, \ldots, M_T$ in the expression can be replaced with a parameter M. The parameter M is a positive integer greater than or equal to 2. Specifically, part 510 may be replaced with: determining, in a time unit n based on at least two resource reservation period parameters $$\{P'_1, P'_2, \ldots, P'_T\},$$

a sensing time unit set corresponding to a candidate time unit $t_y$, where the sensing time unit set includes:

$$\{\{t_{y-1\times P'_1}, t_{y-2\times P'_1}, \ldots, t_{y-M\times P'_1}\}, \{t_{y-1\times P'_2}, t_{y-2\times P'_2}, \ldots, t_{y-M\times P'_2}\}, \ldots, \{t_{y-1\times P'_T}, t_{y-2\times P'_T}, \ldots, t_{y-M\times P'_T}\}\}.$$

Part 610 may be replaced with: determining, in a time unit n based on at least two resource reservation period parameters $\{P'_1, P'_2, \ldots, P'_T\}$, a sensing time unit set corresponding to a candidate time unit $t_y$, where the sensing time unit set includes: a first set $$\{\{t_{y-1\times P'_1}, t_{y-2\times P'_1}, \ldots, t_{y-M\times P'_1}\}, \{t_{y-1\times P'_2}, t_{y-2\times P'_2}, \ldots, t_{y-M\times P'_2}\}, \ldots, \{t_{y-1\times P'_T}, t_{y-2\times P'_T}, \ldots, t_{y-M\times P'_T}\}\}$$

and $K_i$ time units in an interval $(t_{y-j\times P_i-Q}, t_{y-j\times P_i})$ corresponding to each time unit $t_{y-j\times P_i}$ in the first set, where j=1, 2, . . . , M, and i=1, 2, . . . , T. In this case, the sensing time unit set in the method 500 and/or the method 600 may alternatively be represented in another form. It may be understood that, provided that content of the set is the same, various representation forms are included in a range defined by the foregoing expression. In this case, parameters M respectively corresponding to the at least two resource reservation period parameters are the same, so that it can be ensured that each resource reservation period parameter corresponds to M sensing time units, to ensure that each resource reservation period interval may correspond to a same quantity of sensing opportunities, thereby improving fairness and accuracy of the sensing result, reducing a probability of a collision between resources selected by users in the system based on the sensing result, and improving transmission reliability of the system.

In the method 500 and the method 600, optionally, the parameter M or the parameters $M_1, M_2, \ldots, M_T$ is determined based on one or more of the at least two resource reservation period parameters $$\{P'_1, P'_2, \ldots, P'_T\},$$

or the parameter M (or the parameters $M_1, M_2, \ldots, M_T$) is determined based on one or more of the at least two resource reservation period intervals $\{P_1, P_2, \ldots, P_T\}$. Specifically, in some possible implementations, the parameter M is a function of one or more of the at least two resource reservation period parameters, for example, $M=f(P_1, P_2, \ldots, P_T)$. A smaller value of the resource reservation period parameter indicates a larger value of M.

Optionally, the parameters $M_1, M_2, \ldots, M_T$ may be each determined based on a corresponding resource reservation period parameter or a corresponding resource reservation period interval. To be specific, the parameter $M_i$ is determined based on $P_i$, where i=1, 2, . . . , T. In some possible implementations, for any value in i=1, 2, . . . , T, when $P_i$ is less than a period threshold, a corresponding value of $M_i$ is K, where K is a positive integer greater than or equal to 2, for example, 2, 3, 4, 5, 6, 7, or 8; and when $P_i$ is less than the period threshold, a corresponding value of $M_i$ is K', where K' is less than K and greater than or equal to 1. Optionally, the period threshold may be configured by the network device by using signaling, and the configuration signaling may include at least one of DCI signaling, RRC signaling, downlink (DL) media access control (MAC) control element (CE) signaling, and other signaling. Alternatively, the period threshold may be configured by the terminal, and the configuration signaling may include at least one of SCI signaling, PC5-RRC signaling, sidelink (SL) MAC CE signaling, and other signaling.

In some other possible implementations, there are several period ranges $[a_1, b_1]$, $[a_2, b_2]$, . . . , and $[a_N, b_N]$ that may be, for example, predefined in a protocol or configured by the network device, and each period range corresponds to a value $K_j$, where j=1, 2, . . . , N. When $P'_i$ belongs to a period range $[a_j, b_j]$, a corresponding value of $M_i$ is $K_j$, where i=1, 2, . . . , T. The quantity of period ranges may be greater than, less than, or equal to the quantity of resource reservation period parameters, that is, N may be less than, greater than, or equal to T. For example, there is $$\{P'_1, P'_2, P'_3\},$$

and there are period ranges $[a_1, b_1]$, $[a_2, b_2]$, and $[a_3, b_3]$ respectively corresponding to values $K_1$, $K_2$, and $K_3$. If $$P'_1 \text{ and } P'_2$$

belong to the period range $[a_2, b_2]$, and $$P'_3$$

belong to the period range $[a_1, b_1]$, values corresponding to $M_1$ and $M_2$ are $K_2$, and a value of $M_3$ is $K_1$. In addition, there are only the period ranges $[a_1, b_1]$ and $[a_2, b_2]$ respectively corresponding to values $K_1$ and $K_2$. In this case, if $$P'_1$$

the period range $[a_2, b_2]$, and $$P'_2 \text{ and } P'_3$$

belong to the period range $[a_1, b_1]$, a value corresponding to $M_1$ is $K_2$, and values of $M_3$ and $M_2$ are $K_1$.

In the method 500 and the method 600, optionally, the parameter M or the parameters $M_1, M_2, \ldots, M_T$ is determined based on an energy saving state level. The energy saving state level described herein is for reflecting an energy saving state of the terminal or sensing behavior of the terminal, that is, may reflect a value of a current energy saving state or energy saving requirement of the terminal, and is for representing a value of an energy saving requirement or an energy saving state of the terminal, or is for comparing a value of an energy saving requirement or an energy saving state of the terminal with that of another terminal user. The energy saving state level (PRL) is only an example name, and may be replaced with other parameter names that can reflect the energy saving state of the terminal or the sensing behavior of the terminal. For example, the energy saving state of the terminal may include the following three types. First energy saving state: During sensing, only a PSCCH is detected and only first-level SCI is decoded (the first-level SCI is carried in the PSCCH, and includes related control information for scheduling and decoding second-level SCI and/or a PSSCH). Second energy saving state: During sensing, a PSCCH is detected and first-level SCI and second-level SCI are decoded (the second-level SCI is carried in a PSSCH, and provides other related control information for decoding the PSSCH different from the first SCI). Second energy saving state: During sensing, a PSCCH is detected, and two levels of SCI and a related PSSCH are decoded. Among the foregoing three energy saving states, the first energy saving state has a highest level, the second energy saving state has a second highest level, and the third energy saving state has a lowest level. In some possible implementations, three energy saving state level values are defined to indicate the foregoing three energy saving states, and a larger energy saving state level value indicates a lower energy saving state level. For example, in an example given in Table 1, energy saving state level values may be (1, 2, 3) to indicate three energy saving states or three energy saving state levels, and some energy saving state level values may be further reserved for possible future extension, for example, an energy saving state level value 4 in Table 1. Table 1 gives only an example of energy saving state levels. In practice, both a value quantity and specific values of energy saving state level values may vary. For example, eight energy saving state level values are for indicating more energy saving state levels, for example, (1, 2, 3, 4, 5, 6, 7, 8) or (0, 1, 2, 3, 4, 5, 6, 7). Specific energy saving states may alternatively vary in definition. This is not limited in the present disclosure.

TABLE 1

| Energy saving state level value | Energy saving state | Energy saving state level |
|---|---|---|
| 1 | During sensing, only a PSCCH is detected and only first-level SCI is decoded | Highest |
| 2 | During sensing, a PSCCH is detected, and first-level SCI and second-level SCI are decoded | Second highest |

TABLE 1-continued

| Energy saving state level value | Energy saving state | Energy saving state level |
|---|---|---|
| 3 | During sensing, a PSCCH is detected, and two levels of SCI and a related PSSCH are decoded | Lowest |
| 4 | Reserved | — |

Specifically, the parameter M or the parameters $M_1, M_2, \ldots, M_T$ may be determined based on the energy saving state levels in the following manners.

First manner: When an energy saving state level value is less than an energy saving state threshold, a value of the parameter M is K (or values of the parameters $M_1, M_2, \ldots, M_T$ are all K), where K is a positive integer greater than or equal to 2, for example, 2, 3, 4, 5, 6, 7, or 8; and when an energy saving state level value is greater than the energy saving state threshold, a value of the parameter M is K' (or values of the parameters $M_1, M_2, \ldots, M_T$ are all K'), where K' is less than K and greater than or equal to 1. Optionally, the energy saving state threshold may be configured by the network device by using signaling, and the configuration signaling may include at least one of DCI signaling, RRC signaling, DL MAC CE signaling, and other signaling. Alternatively, the energy saving state threshold may be configured by the terminal by using sidelink signaling, and the sidelink signaling may include at least one of SCI (first-level SCI and/or second-level SCI) signaling, PC5-RRC signaling, SL MAC CE signaling, and other signaling.

Second manner: There are several energy saving level ranges $[a_1, b_1]$, $[a_2, b_2]$, . . . , and $[a_N, b_N]$ that may be, for example, predefined in a protocol, configured by the network device, or preconfigured, and each saving level range corresponds to a value $K_j$, where j=1, 2, . . . , N. When an energy saving state level value belongs to an energy saving level range $[a_j, b_j]$, a value of the parameter M is $K_i$ (or values of the parameters $M_1, M_2, \ldots, M_T$ are all $K_j$), where N is a positive integer greater than or equal to 2, and i=1, 2, . . . , T.

In the method 500 and the method 600, optionally, the parameter M or the parameters $M_1, M_2, \ldots, M_T$ are determined based on a congestion control measurement parameter. The congestion control measurement parameter may reflect a channel congestion degree or an interference level in a communication environment. The congestion control measurement parameter may be at least one of a channel busy ratio (CBR), a channel occupancy ratio (CR), an RSRP measurement parameter, and an RSSI measurement parameter. Specifically, when the parameter M or the parameters $M_1, M_2, \ldots, M_T$ is determined based on the congestion control measurement parameter, the foregoing two manners may also be used. To be specific, different values of the parameter M or the parameters $M_1, M_2, \ldots, M_T$ are determined based on a comparison between the congestion control measurement parameter and the congestion threshold, or different values of the parameter M or the parameters $M_1, M_2, \ldots, M_T$ are determined based on a congestion range to which the congestion control measurement parameter belongs. For a similar example, refer to the foregoing description. Details are not described herein again. In some possible implementations, the congestion control measurement parameter is determined by the terminal based on a historical measurement value, or is obtained by the terminal through measurement in the time unit n.

In the method 500 and the method 600, optionally, the parameter M or the parameters $M_1, M_2, \ldots, M_T$ is determined based on a priority of to-be-sent sidelink information. In some possible implementations, when the priority value of the to-be-sent sidelink information of the terminal is less than a priority threshold, the parameter M is a first value or the parameters $\{M_1, M_2, \ldots, M_T\}$ each are a first value. In some other possible implementations, when the priority value of the to-be-sent sidelink information is greater than or equal to the first threshold, the parameter M is a second value or the parameters $\{M_1, M_2, \ldots, M_T\}$ each are a second value. The foregoing two implementations may be implemented separately or may be combined. If the two implementations are combined, the first value is greater than the second value. The to-be-sent sidelink information may include information carried on a PSCCH, a PSSCH, a PSFCH, and/or a physical sidelink broadcast channel (PSBCH). In some other possible implementations, there are several priority value ranges $[a_1, b_1]$, $[a_2, b_2]$, . . . , and $[a_N, b_N]$ that may be, for example, predefined in a protocol or configured by the network device, and each priority value range corresponds to a value $K_j$, where j=1, 2, . . . , N. When a priority value of the to-be-sent sidelink information of the terminal belongs to a priority value range $[a_j, b_j]$, a value of the parameter M is $K_j$ (or values of the parameters $M_1, M_2, \ldots, M_T$ are all $K_j$), where N is a positive integer greater than or equal to 2, and i=1, 2, . . . , T. The priority value of the sidelink information may be configured by the network device, or may be determined by the terminal based on preconfiguration information. For example, a smaller priority value indicates a higher priority. Similarly, the priority threshold may be configured by the network device by using signaling, or may be configured by another terminal by using signaling. An example of the configuration signaling is the same as that in the foregoing similar part, and details are not described herein again.

It should be understood that a plurality of manners of determining the parameter M or the parameters $M_1, M_2, \ldots, M_T$ are described above. These implementations may be separately implemented, or may be combined. The parameter M or the parameters $M_1, M_2, \ldots, M_T$ may be determined based on one or a combination of at least two resource reservation period parameters, an energy saving state level, a congestion control measurement parameter, and a priority of to-be-sent sidelink information.

In the method 500 and the method 600, optionally, the parameter M or the parameters $M_1, M_2, \ldots, M_T$ may be preconfigured, or the parameter M or the parameters $M_1, M_2, \ldots, M_T$ is configured by the network device or another terminal device. The configuration signaling of the network device may include at least one of DCI signaling, RRC signaling, DL MAC CE signaling, and other signaling. The configuration signaling of the terminal may include at least one of SCI signaling, PC5-RRC signaling, SL MAC CE signaling, and other signaling. In some possible implementations, the parameter M or the parameters $M_1, M_2, \ldots, M_T$ is configured by the network device or another terminal device. In this case, before part 510 or part 610, the method further includes: receiving first configuration signaling from a network device or a terminal, where the first configuration information indicates configuration information of M or $M_1, M_2, \ldots, M_T$. In another implementation, the method 500 further includes: receiving second configuration signaling from a network device, where the second configuration signaling indicates configuration information of M or $M_i$, where i=1, 2, . . . , T.

Optionally, the method 500 and the method 600 may further include: receiving second configuration signaling from the network device, where the second configuration signaling includes configuration information of a sidelink resource pool. The resource selection window, the sensing time unit set, and the time unit n all belong to a range of the sidelink resource pool. Specifically, the configuration information of the sidelink resource pool may indicate a size of a time-frequency resource of the resource pool (including a quantity and locations of time units included in the resource pool, a size of a subchannel, and a quantity of subchannels), configuration information of a PSCCH (including a time domain size and a frequency domain size of a control channel), configuration information of a PSSCH (including DMRS pattern configuration information of the PSSCH, MCS table configuration information, a resource reservation period interval, and the like), configuration information of a PSFCH (including a frequency domain size of the PSFCH, a time domain period in which the PSFCH exists, code domain information used by the PSFCH, and the like), and other configuration information for sidelink communication. In some possible implementations, the configuration information of the at least two resource reservation period parameters $$\{P'_1, P'_2, \ldots, P'_T\}$$

or the configuration information of the at least two resource reservation period intervals $$\{P_1, P_2, \ldots, P_T\}$$

and the configuration information of the sidelink resource pool are carried in one same piece of configuration signaling. In other words, the second configuration signaling is further for indicating the at least two resource reservation period intervals $$\{P_1, P_2, \ldots, P_T\}$$

or the at least two resource reservation period parameters $$\{P'_1, P'_2, \ldots, P'_T\}.$$

Optionally, the first configuration signaling or the second configuration signaling is a system information block (SIB), RRC signaling, or physical layer control information.

In addition, in some implementations provided in this embodiment of the present disclosure, the terminal needs to measure a channel congestion status to obtain a congestion control parameter. An embodiment of the present disclosure further provides a congestion control parameter measurement method, which may be for channel congestion measurement in a non-full sensing mode (for example, a partial sensing mode, a random selection mode, or a DRX state). The congestion control parameter may be, for example, a CBR and/or a CR.

The congestion control parameter measurement method may be applied to the method 500 and the method 600. In this case, the method 500 may further include optional part 530, or the method 600 further includes optional part 630: determining, based on a received signal strength indicator RSSI in each time unit in a measurement time window [n−a, n−1], a congestion control parameter corresponding to the time unit n, or determining, based on RSSIs in time units at intervals of K time units in a measurement time window [n−a, n−1], a congestion control parameter corresponding to the time unit n.

K is a positive integer greater than 1, and may be configured by the network device, configured by the terminal device, preconfigured, or predefined in a protocol. In an implementation, in a measurement time window [n−a, n−1], measurement is performed once in a time unit n−a, measurement is performed once in a time unit n−a+K, and measurement is performed once in a time unit n−a+2K. The rest may be deduced by analogy. In another optional implementation, a time unit offset $T_{offset}$ relative to a time unit n−a is defined, measurement is performed once in a time unit n−a+$T_{offset}$, measurement is performed once in a time unit n−a+$T_{offset}$+K, and measurement is performed once in a time unit n−a+$T_{offset}$+2K. The rest may be deduced by analogy.

Optionally, a sidelink transmission parameter is determined based on the congestion control parameter, and/or a transfer mode for sending sidelink data is determined based on the congestion control parameter. The transfer mode includes a sensing mode (that is, a full sensing mode), a partial sensing mode, a random resource selection mode, and the like. Optionally, it may be further determined, based on the congestion control parameter, whether to perform re-evaluation or preemption detection for resource selection.

Alternatively, the congestion control parameter measurement method 700 may not be combined with the method 500 or the method 600, but is applied to channel congestion measurement in any other non-full sensing mode. In this case, the method 700 includes part 710 and part 720.

Part 710: Determine, based on a received signal strength indicator RSSI in at least one time unit in a measurement time window [n−a, n−1], a congestion control parameter corresponding to a time unit n, where a is a positive integer greater than 1, and the RSSI in one of the at least one time unit is a linear average value of total received powers of sidelink subchannels on some symbols in the time unit.

In part 710, optionally, the at least one time unit is all time units in the measurement time window [n−a, n−1], or the at least one time unit is time units at intervals of K time units in the measurement time window [n−a, n−1]. K is a positive integer greater than 1, and may be configured by the network device, configured by the terminal device, preconfigured, or predefined in a protocol. In an implementation, in a measurement time window [n−a, n−1], measurement is performed once in a time unit n−a, measurement is performed once in a time unit n−a+K, and measurement is performed once in a time unit n−a+2K. The rest may be deduced by analogy. In another optional implementation, a time unit offset $T_{offset}$ relative to a time unit n−a is defined, measurement is performed once in a time unit n−a+$T_{offset}$, measurement is performed once in a time unit n−a+$T_{offset}$+K, and measurement is performed once in a time unit n−a+$T_{offset}$+2K. The rest may be deduced by analogy.

Part 720: Determine a sidelink transmission parameter based on the congestion control parameter, and/or determine, based on the congestion control parameter, a transfer mode for sending sidelink data. The transfer mode includes a sensing mode (that is, a full sensing mode), a partial sensing mode, a random resource selection mode, and the like. Optionally, it may be further determined, based on the congestion control parameter, whether to perform re-evaluation or preemption detection for resource selection.

For example, the terminal may determine a CBR measurement value in the time unit n, where the CBR measurement value is determined based on SL RSSI measurement in a measurement window before the time unit n. For example, the measurement window includes a time units from a time unit n−1 to a time unit n−a, and a is an integer greater than or equal to 1, for example, a=100.

In part 530 or the method 700, optionally, a value of a in the measurement window may be related to a subcarrier spacing (SCS). For example, a value of a corresponding to a 15 kHz SCS is 100, a value of a corresponding to a 30 kHz SCS is 200, and a value of a corresponding to a 60 kHz SCS is 400. Optionally, a is a quantity of time units included in 100 ms in different SCSs. Different subcarrier spacings may correspond to different values of a, and the different values of a are predefined, or are configured by the network device. For example, when SCS=15 kHz, a value of a may be any one of 80, 70, 65, 60, 55, 50, 45, 40, 35, 30, 25, 20, 15, or 10. When another SCS is used, for example, SCS=X kHz, a value of a may be a product of a=X/15 and any value of (80, 70, 65, 60, 55, 50, 45, 40, 35, 30, 25, 20, 15, or 10).

In some possible implementations, specifically, to determine the congestion control parameter based on the RSSI, whether an RSSI in each time unit is greater than an RSSI threshold needs to be determined, to obtain a ratio of a quantity of subchannels whose RSSI is greater than the RSSI threshold in the measurement time window to a quantity of all subchannels. In some other possible implementations, the RSSI is measured at intervals of K time units in the measurement time window, and a ratio of a quantity of subchannels whose RSSI is greater than the RSSI threshold to a quantity of all subchannels is determined, or a ratio of a quantity of subchannels whose RSSI is greater than the RSSI threshold in a measurement time unit to a quantity of all subchannels in all measurement time units is determined. For example, when first measurement is performed on the time unit n−a, a total quantity of all measurement time units is $\lfloor a-1/K \rfloor$; and when first measurement is performed on the time unit n−a+$T_{offset}$, a total quantity of all measurement time units is $$\left\lfloor \frac{a-1-T_{offset}}{K} \right\rfloor.$$

In part 530 or the method 700, optionally, the RSSI in one time unit is a linear average value of total received powers of sidelink subchannels on N symbols in the time unit, where In a possible implementation, N is greater than or equal to 1 and less than or equal to a total quantity of symbols for mapping a PSCCH and a PSSCH in the time unit. In a time unit, a first symbol is usually for automatic gain control (AGC), and a last symbol may be a guard interval symbol (GAP symbol). In this case, the N symbols do not include the first symbol and/or the last symbol in the time unit. For example, a time unit includes 12 symbols: 0 to 11, a first symbol is for AGC, a last symbol is for GAP, and other symbols are for mapping a PSCCH and a PSSCH. In this case, the N symbols may include one or more of symbols (1, 2, 3, 4, 5, 6, 7, 8, 9, 10). The symbol described in embodiments of the present disclosure is an orthogonal frequency division multiplexing (OFDM) symbol.

Figure 10:
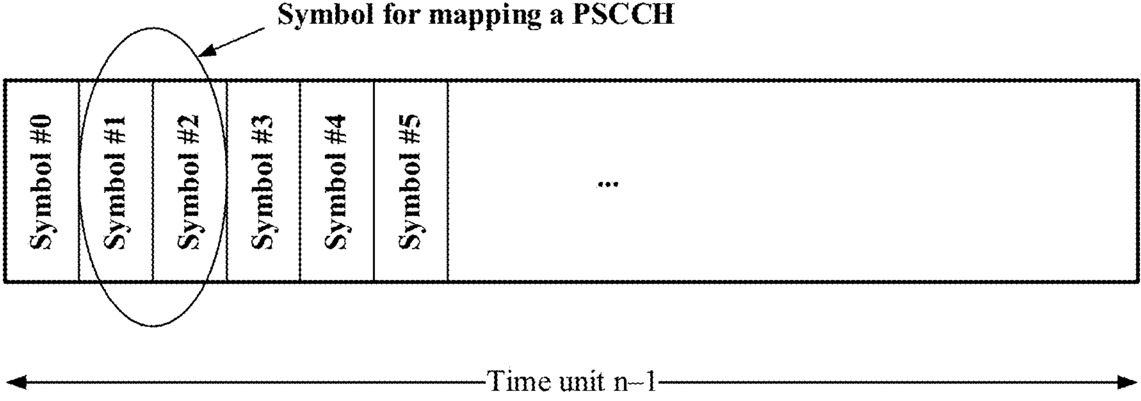
FIG. 10 is a schematic diagram of a symbol for mapping a PSCCH in a time unit.

In another possible implementation, the quantity N is a quantity of symbols for mapping the PSCCH in the time unit, or the quantity N is a total quantity of symbols for mapping the PSCCH and for mapping the second-level SCI in the time unit. The second-level SCI is carried in a PSSCH, and provides other related control information for decoding the PSSCH different from the first SCI. The quantity of symbols for mapping the PSCCH may be configured by the network device by using RRC signaling or preconfigured. As shown in FIG. 10, there are two symbols for mapping a PSCCH in a time unit n−1: a symbol #1 and a symbol #2. In this case, for the time unit n−1, the terminal performs RSSI measurement only on subchannels on the two symbols (the symbol #1 and the symbol #2).

In still another possible implementation, N is determined based on the energy saving state level. Optionally, a higher energy saving state level indicates a smaller value of N. The method for determining the quantity N based on the energy saving state level is similar to the foregoing implementation of determining the parameter M based on the energy saving state level, and is not repeated herein.

In yet another possible implementation, N is indicated by the configuration information of the resource pool, or N is predefined.

In part 530 or the method 700, optionally, the measurement window may include a sensing time unit set, and the terminal may determine the congestion control parameter based on only an RSSI in a time unit that is in the measurement window and that does not belong to the sensing time unit set.

It should be understood that the solutions in embodiments of the present disclosure may be properly combined for use, and explanations or descriptions of terms in embodiments may be cross-referenced or explained in embodiments. This is not limited.

It should be further understood that sequence numbers of the foregoing processes do not mean execution sequences in embodiments of the present disclosure. The execution sequences of the processes should be determined based on functions and internal logic of the processes. Numbers or sequence numbers in the foregoing processes are merely for differentiation for ease of description, and should not constitute any limitation on an implementation process of embodiments of the present disclosure.

The methods provided in embodiments of the present disclosure are described above in detail with reference to FIG. 5 to FIG. 10. An apparatus provided in embodiments of the present disclosure is described in detail below with reference to FIG. 11 to FIG. 14.

Figure 11:
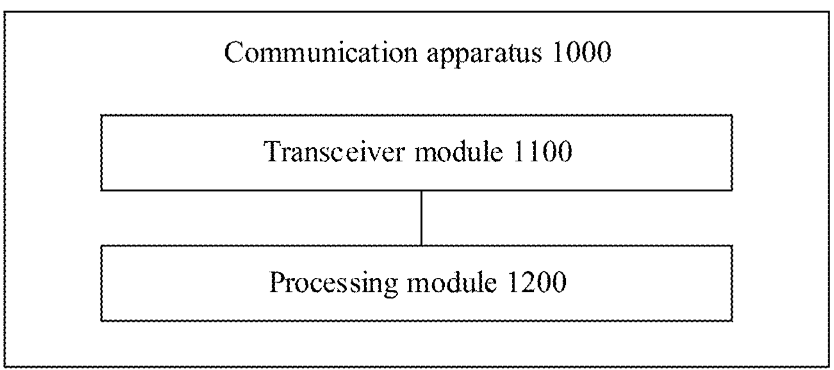
FIG. 11 is a schematic diagram of a structure of a communication apparatus according to an embodiment of the present disclosure.

FIG. 11 is a schematic block diagram of a communication apparatus according to an embodiment of the present disclosure. The communication apparatus may be a terminal or a network device, may be a part or a component that has a function of a terminal or a network device, or may be a chip (for example, a baseband chip) applied to a terminal or a network device. The function or the module may be implemented by software, may be implemented by hardware, may be implemented by hardware by executing corresponding software, or may be implemented by a combination of software and hardware. Alternatively, the communication apparatus may be another communication module, configured to implement the method in method embodiments of the present disclosure. As shown in FIG. 11, the communication apparatus 1000 may include a transceiver module 1100 and a processing module 1200. Optionally, the communication apparatus may further include a storage module 1300.

In a possible design, the processing module and the transceiver module in FIG. 11 may be implemented by one or more processors; may be implemented by one or more processors and a memory; may be implemented by one or more processors and a transceiver; or may be implemented by one or more processors, a memory, and a transceiver. This is not limited in embodiments of the present disclosure. The processor, the memory, and the transceiver may be disposed separately, or may be integrated.

Optionally, the modules in the communication apparatus 1000 in this embodiment of the present disclosure may be configured to perform the method described in FIG. 5 or FIG. 6 or the method 700 in embodiments of the present disclosure.

In some embodiments, the communication apparatus 1000 may include a transceiver module 1100 and a processing module 1200. The modules in the communication apparatus 1000 may be configured to implement the method 500 provided in embodiments of the present disclosure. The processing module 1200 is configured to determine, in a time unit n based on at least two resource reservation period parameters $$\{P'_1, P'_2, \ldots, P'_T\}.$$

a sensing time unit set corresponding to a candidate time unit $t_y$, where the sensing time unit set includes:

$$\{\{t_{y-1\times P'_1}, t_{y-2\times P'_1}, \ldots, t_{y-M_1\times P'_1}\}, \{t_{y-1\times P'_2}, t_{y-2\times P'_2}, \ldots, t_{y-M_2\times P'_2}\}, \ldots, \{t_{y-1\times P'_T}, t_{y-2\times P'_T}, \ldots, t_{y-M_T\times P'_T}\}\},$$

where T is a positive integer greater than or equal to 2, parameters $M_1$ to $M_T$ each are a positive integer greater than or equal to 1, and the parameters $M_1$ to $M_T$ are not all equal to 1; and the candidate time unit $t_y$ is located in a resource selection window after the time unit n, and the sensing time unit set is located before the time unit n. The processing module 1200 is further configured to exclude, based on a sensing result in the sensing time unit set, an unavailable candidate resource unit in the candidate time unit $t_y$.

Optionally, each of the parameters $M_1$ to $M_T$ is 1.

The communication apparatus 1000 determines the sensing time unit set corresponding to the candidate time unit $t_y$ based on the at least two resource reservation period parameters, and any resource reservation period parameter may correspond to one or more sensing time units; and an unavailable candidate resource unit is excluded based on a sensing result in the sensing time unit set, thereby satisfying data QoS to some extent while achieving an energy saving objective, so that a plurality of period parameters can be considered more flexibly and more properly, and the sensing time unit set can be determined more flexibly and more properly. When a quantity of sensing time units is small, it can be ensured that a probability of a collision between a sending resource finally determined by the terminal and a sending resource selected by another terminal is low, and higher reliability is achieved. In other words, communication reliability and communication efficiency are high in a case of energy saving.

In some embodiments, the communication apparatus 1000 may include a transceiver module 1100 and a processing module 1200. The modules in the communication apparatus may be configured to implement the method 600 provided in embodiments of the present disclosure. The processing module 1200 is configured to determine, in a time unit n based on at least one resource reservation period parameter $$\{P'_1, P'_2, \ldots, P'_T\},$$

a sensing time unit set corresponding to a candidate time unit $t_y$, where the sensing time unit set includes: a first set $$\{\{t_{y-1\times P'_1}, t_{y-2\times P'_1}, \ldots, t_{y-M_1\times P'_1}\}, \{t_{y-1\times P'_2}, t_{y-2\times P'_2}, \ldots, t_{y-M_2\times P'_2}\}, \ldots, \{t_{y-1\times P'_T}, t_{y-2\times P'_T}, \ldots, t_{y-M_T\times P'_T}\}\},$$

and $K_i$ time units in an interval $(t_{y-j_i\times P_i-Q}, t_{y-j_i\times P_i})$ corresponding to each time unit $t_{y-j_i\times P_i}$ in the first set, where $j_i=1, 2, \ldots, M_i$, $i=1, 2, \ldots, T$, T is a positive integer greater than or equal to 1, Q is a positive integer greater than or equal to 1, for $i=1, 2, \ldots, T$, $K_i$ is a positive integer greater than or equal to 1, and $M_1$ to $M_T$ each are a positive integer greater than or equal to 1; and the candidate time unit $t_y$ is located in a resource selection window after the time unit n, and the sensing time unit set is located before the time unit n. The processing module 1200 is further configured to exclude, based on a sensing result in the sensing time unit set, an unavailable candidate resource unit in the candidate time unit $t_y$.

The communication apparatus determines the sensing time unit set corresponding to the candidate time unit $t_y$ based on the at least one resource reservation period parameter, where any resource reservation period parameter may correspond to one or more sensing time units, and the sensing time unit set includes the first set and $K_i$ time units in an interval $$(t_{y-j_i\times P'_i-Q}, t_{y-j_i\times P'_i})$$

corresponding to each time unit $$t_{y-j_i\times P'_i}$$

in the first set, which is equivalent to that based on the first set, the sensing time unit set determined by the communication apparatus further includes one or more time units in a range of Q time units after each time unit in the first set. Not only the at least one period parameter can be considered more flexibly and more properly, but also an additional aperiodic sensing opportunity can be adaptively added for each period parameter, so that communication reliability and communication efficiency are higher.

Optionally, the candidate time unit $t_y$ may be located in a candidate time unit set in a resource selection window, the resource selection window may be represented as $[n+T_1, n+T_2]$, where [A, B] indicates a value range including boundary points A and B, the candidate time unit set is a subset of the resource selection window, that is, includes Y time units in the resource selection window, Y is a positive integer greater than 0, and a value of Y may be determined by the terminal, configured by the network device, or preconfigured. In addition, optionally, a minimum value of Y may be configured by the network device or preconfigured. In some possible implementations, the processing module 1200 is further configured to: select a candidate time unit set in the resource selection window, determine a corresponding sensing unit set for any candidate time unit in the candidate time unit set, and exclude unavailable candidate resource units in all time units in the candidate time unit set, to obtain a set of available resources. The processing module 1200 may be further configured to select, from the set of available resources, a time-frequency resource for sending data. In some other possible implementations, the candidate time unit $t_y$ is any time unit in the resource selection window $[n+T_1, n+T_2]$. To be specific, the processing module 1200 is further configured to: determine a sensing time unit set corresponding to any candidate time unit in the candidate time unit set, and exclude unavailable candidate resource units in all time units in the candidate time unit set, to obtain a set of available resources.

Optionally, the at least two resource reservation period parameters are preconfigured, or are configured by the network device or another terminal. To be specific, the communication apparatus may directly obtain the at least two resource reservation period parameters in a unit of a logical time unit, without performing conversion.

Optionally, the processing module 1200 is further configured to convert at least two resource reservation period intervals $\{P_1, P_2, \ldots, P_T\}$ to obtain the at least two resource reservation period parameters $$\{P'_1, P'_2, \ldots, P'_T\},$$

where T is a positive integer greater than or equal to 2. The period reservation period interval P is generally a value in a unit of millisecond ms. For example, the processing module 1200 in the communication apparatus may convert each resource reservation period interval based on the following formula:

$$P' = \left\lceil \frac{N}{20 \text{ ms}} \times P \right\rceil,$$

where N is a quantity of time units for SL transmission within 20 ms. The foregoing formula is merely an example, and the communication apparatus may use another conversion manner. This is not limited in this embodiment of the present disclosure. Optionally, the at least two resource reservation period intervals $\{P_1, P_2, \ldots, P_T\}$ are preconfigured, or the at least two resource reservation period intervals $\{P_1, P_2, \ldots, P_T\}$ are configured by the network device or another terminal.

Optionally, values of the parameters $M_1, M_2, \ldots, M_T$ are all equal. In this case, the parameters $M_1, M_2, \ldots, M_T$ in the expression can be replaced with a parameter M. The parameter M is a positive integer greater than or equal to 2.

Optionally, the parameter M or the parameters $M_1, M_2, \ldots, M_T$ is determined based on one or more of the at least two resource reservation period parameters $$\{P'_1, P'_2, \ldots, P'_T\},$$

or the parameter M (or the parameters $M_1, M_2, \ldots, M_T$) is determined based on one or more of the at least two resource reservation period intervals $\{P_1, P_2, \ldots, P_T\}$.

Optionally, the parameters $M_1, M_2, \ldots, M_T$ may be each determined based on a corresponding resource reservation period parameter or a corresponding resource reservation period interval. To be specific, the parameter $M_i$ is determined based on $P_i$, where i=1, 2, . . . , T.

Optionally, the parameter M or the parameters $M_1, M_2, \ldots, M_T$ is determined based on an energy saving state level.

Optionally, the parameter M or the parameters $M_1, M_2, \ldots, M_T$ are determined based on a congestion control measurement parameter. The congestion control measurement parameter may reflect a channel congestion degree or an interference level in a communication environment. The congestion control measurement parameter may be at least one of a channel busy ratio CBR, a channel occupancy ratio CR, an RSRP measurement parameter, and an RSSI measurement parameter.

Optionally, the parameter M or the parameters $M_1, M_2, \ldots, M_T$ is determined based on a priority of to-be-sent sidelink information.

It should be understood that the foregoing plurality of manners of determining the parameter M or the parameters $M_1, M_2, \ldots, M_T$ may be separately implemented, or may be combined. The parameter M or the parameters $M_1, M_2, \ldots, M_T$ may be determined based on one or a combination of at least two resource reservation period parameters, an energy saving state level, a congestion control measurement parameter, and a priority of to-be-sent sidelink information. For specific details, refer to descriptions in the method 500 and the method 600. Details are not described herein again.

Optionally, the parameter M or the parameters $M_1, M_2, \ldots, M_T$ may be preconfigured, or the parameter M or the parameters $M_1, M_2, \ldots, M_T$ is configured by the network device or another terminal device. For specific details, refer to descriptions in the method 500 and the method 600. Details are not described herein again. In some possible implementations, the parameter M or the parameters $M_1, M_2, \ldots, M_T$ is configured by the network device or another terminal device. In this case, the transceiver module 1100 is configured to receive first configuration signaling from a network device or a terminal, where the first configuration information includes configuration information of the parameter M or the parameters $M_1, M_2, \ldots, M_T$. In some other implementations, the transceiver module 1100 is further configured to receive second configuration signaling from a network device, where the second configuration signaling indicates configuration information of the parameter M or the parameters $M_1, M_2, \ldots, M_T$. The parameter $M_1, M_2, \ldots, M_T$ may also be represented as $M_i$, where i=1, 2, . . . , T.

Optionally, the transceiver module 1100 is further configured to receive second configuration signaling from the network device, where the second configuration signaling includes configuration information of a sidelink resource pool. The resource selection window, the sensing time unit set, and the time unit n all belong to a range of the sidelink resource pool. In some possible implementations, the configuration information of the at least two resource reservation period parameters $$\{P'_1, P'_2, \ldots, P'_T\}$$

or the confirmation information of the at least two resource reservation period intervals $\{P_1, P_2, \ldots, P_T\}$ and the configuration information of the sidelink resource pool are carried in one same piece of configuration signaling. In other words, the second configuration signaling is further for indicating the at least two resource reservation period intervals $\{P_1, P_2, \ldots, P_T\}$ or the at least two resource reservation period parameters $$\{P'_1, P'_2, \ldots, P'_T\}.$$

Optionally, the first configuration signaling or the second configuration signaling is a system information block SIB, RRC signaling, or physical layer control information.

Optionally, the processing module 1200 is further configured to: determine, based on a received signal strength indicator RSSI in each time unit in a measurement time window [n−a, n−1], a congestion control parameter corresponding to the time unit n, or determine, based on RSSIs in time units at intervals of K time units in a measurement time window [n−a, n−1], a congestion control parameter corresponding to the time unit n, where a is an integer greater than or equal to 1, and K is a positive integer greater than 1.

Optionally, K may be configured by the network device, configured by the terminal device, preconfigured, or predefined in a protocol. In an implementation, in a measurement time window [n−a, n−1], measurement is performed once in a time unit n−a, measurement is performed once in a time unit n−a+K, and measurement is performed once in a time unit n−a+2K. The rest may be deduced by analogy. In another optional implementation, a time unit offset $T_{offset}$ relative to a time unit n−a is defined, measurement is performed once in a time unit $n-a+T_{offset}$, measurement is performed once in a time unit $n-a+T_{offset}+K$, and measurement is performed once in a time unit $n-a+T_{offset}+2K$. The rest may be deduced by analogy.

Optionally, the processing module 1200 is further configured to: determine a sidelink transmission parameter based on the congestion control parameter, and/or determine, based on the congestion control parameter, a transfer mode for sending sidelink data. The transfer mode includes a sensing mode (that is, a full sensing mode), a partial sensing mode, a random resource selection mode, and the like. Optionally, the processing module 1200 may be further configured to determine, based on the congestion control parameter, whether to perform re-evaluation or preemption detection for resource selection.

It should be understood that, for parameters, solution details, implementations, beneficial effects, and the like in a specific process in which the modules in the communication apparatus 100 implement the method 500 or 600 provided in embodiments of the present disclosure, refer to the detailed descriptions in the foregoing method embodiments. For brevity, details are not described in this part again.

In some embodiments, the communication apparatus 1000 may include a processing module 1200. The modules in the communication apparatus 1000 may be configured to implement the method 700 provided in embodiments of the present disclosure. Specifically, the processing module 1200 is configured to determine, based on a received signal strength indicator RSSI in at least one time unit in a measurement time window [n−a, n−1], a congestion control parameter corresponding to a time unit n, where a is a positive integer greater than 1, and the RSSI in one of the at least one time unit is a linear average value of total received powers of sidelink subchannels on some symbols in the time unit. The processing module 1200 is further configured to: determine a sidelink transmission parameter based on the congestion control parameter, and/or determine, based on the congestion control parameter, a transfer mode for sending sidelink data. The transfer mode includes a sensing mode (that is, a full sensing mode), a partial sensing mode, a random resource selection mode, and the like. Optionally, the processing module 1200 may be further configured to determine, based on the congestion control parameter, whether to perform re-evaluation or preemption detection for resource selection.

Optionally, the at least one time unit is all time units in the measurement time window [n−a, n−1], or the at least one time unit is time units at intervals of K time units in the measurement time window [n−a, n−1], where K is a positive integer greater than 1.

In some implementations, K may be configured by the network device, configured by the terminal device, preconfigured, or predefined in a protocol. In an implementation, in a measurement time window [n−a, n−1], measurement is performed once in a time unit n−a, measurement is performed once in a time unit n−a+K, and measurement is performed once in a time unit n−a+2K. The rest may be deduced by analogy. In another optional implementation, a time unit offset $T_{offset}$ relative to a time unit n−a is defined, measurement is performed once in a time unit $n-a+T_{offset}$, measurement is performed once in a time unit $n-a+T_{offset}+K$, and measurement is performed once in a time unit $n-a+T_{offset}+2K$. The rest may be deduced by analogy.

Optionally, a value of a in the measurement window may be related to an SCS. For example, a value of a corresponding to a 15 kHz SCS is 100, a value of a corresponding to a 30 kHz SCS is 200, and a value of a corresponding to a 60 kHz SCS is 400. Optionally, a is a quantity of time units included in 100 ms in different SCSs. Different subcarrier spacings may correspond to different values of a, and the different values of a are predefined, or are configured by the network device.

Optionally, the RSSI in one time unit is a linear average value of total received powers of sidelink subchannels on N symbols in the time unit, where N is greater than or equal to 1 and less than or equal to a total quantity of symbols for mapping a PSCCH and a PSSCH in the time unit.

Optionally, the quantity N is a quantity of symbols for mapping a PSCCH in the time unit. Alternatively, the quantity N is a total quantity of symbols for mapping the PSCCH and for mapping the second-level SCI in the time unit. Alternatively, N is determined based on the energy saving state level. N is indicated by the configuration information of the resource pool, or N is predefined.

Optionally, the measurement window may include a sensing time unit set, and the terminal may determine the congestion control parameter based on only an RSSI in a time unit that is in the measurement window and that does not belong to the sensing time unit set.

It should be understood that, for parameters, solution details, implementations, beneficial effects, and the like in a specific process in which the modules in the communication apparatus 100 implement the method 700 provided in embodiments of the present disclosure, refer to the detailed descriptions in the foregoing method embodiments. For brevity, details are not described in this part again.

Figure 13:
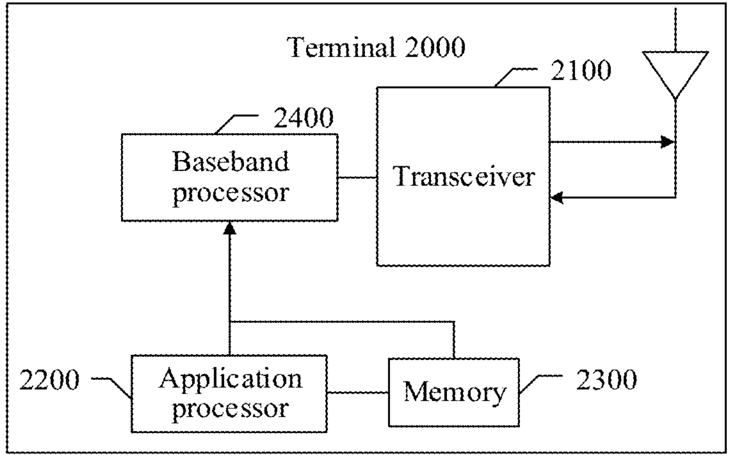
FIG. 13 is a schematic diagram of a structure of a terminal device according to an embodiment of the present disclosure.

When the communication apparatus 1000 is a terminal or a component having a terminal function, the transceiver module 1100 may correspond to a transceiver 2100 in a terminal 2000 shown in FIG. 13, the processing module 1200 may correspond to a baseband processor 2400 in the terminal 2000 shown in FIG. 13, and the storage module 1300 may correspond to a memory 2300 in the terminal 2000 shown in FIG. 13. When the communication apparatus

1000 is a communication chip applied to a terminal, the communication apparatus 1000 may correspond to a baseband processor 2400 (or referred to as a baseband chip) shown in FIG. 13. In this case, the transceiver module 1100 may be an input/output interface, the processing module 1200 may include one or more CPU processors, a digital signal processor, and the like in the baseband chip, and the storage module 1300 may be a memory in the baseband chip or a memory outside the baseband chip.

Figure 14:
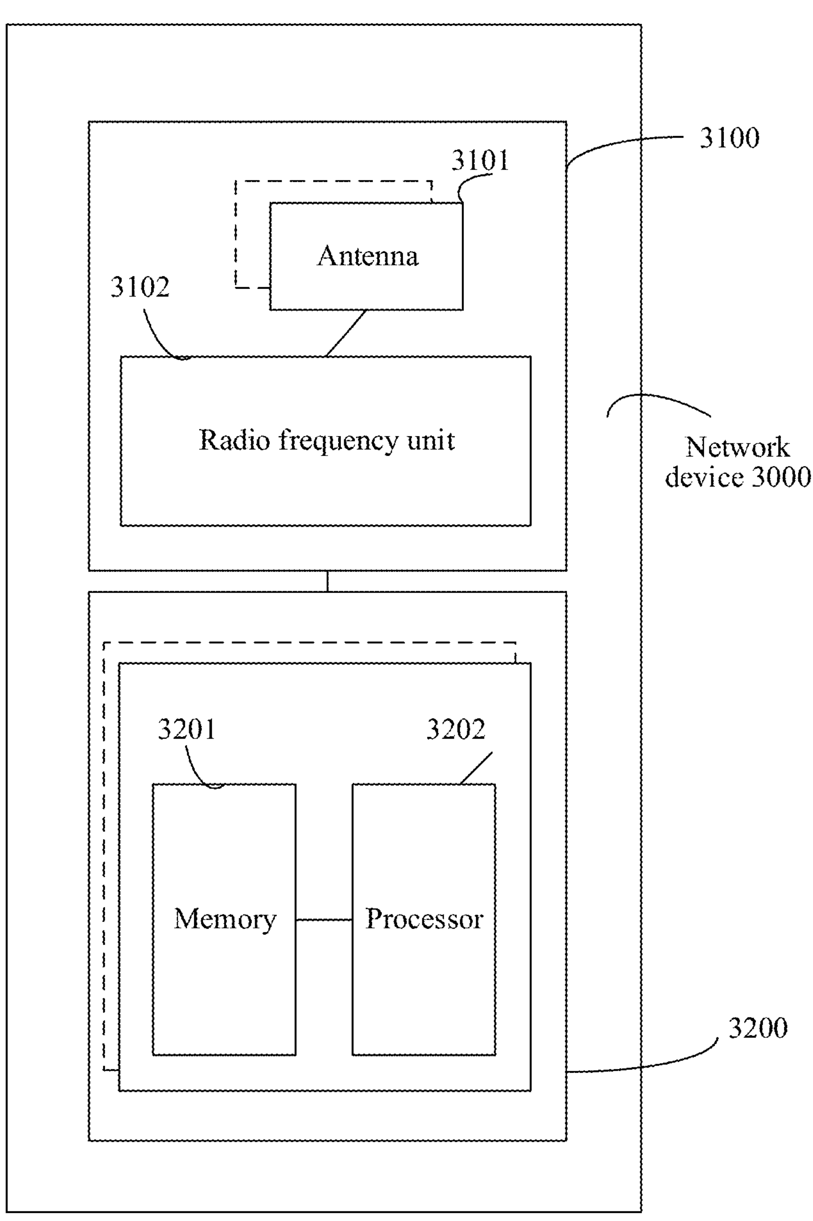
FIG. 14 is a schematic diagram of a structure of a network device according to an embodiment of the present disclosure.

When the communication apparatus 1000 is a network device or a component having a network device function, the transceiver module 1100 may correspond to a radio frequency unit 3102 and/or an antenna 3101 in a network device 3000 shown in FIG. 14, the processing module 1200 may correspond to a processor 3202 in the network device 3000 shown in FIG. 14, and the storage module 1300 may correspond to a memory 3201 in the network device 3000 shown in FIG. 14. When the communication apparatus 1000 is a communication chip (or may be a board) applied to a network device, the communication apparatus 1000 may correspond to a processing module 3200 (or may be a communication board) shown in FIG. 14. In this case, the transceiver module 1100 may be an input/output interface, the processing module 1200 may include one or more CPU processors, a digital signal processor, and the like in the chip, and the storage module 1300 may be a memory in the chip or a memory outside the baseband chip.

Figure 12:
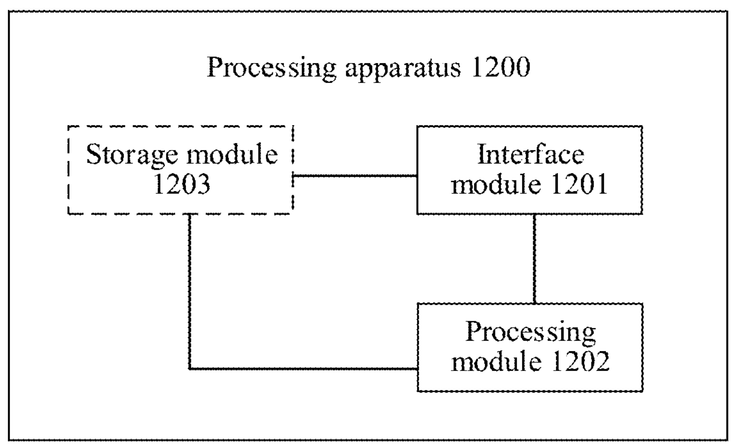
FIG. 12 is a schematic diagram of a structure of a processing apparatus according to an embodiment of the present disclosure.

FIG. 12 is a schematic diagram of a structure of a processing apparatus 1200 according to an embodiment of the present disclosure. As shown in the figure, the processing apparatus 1200 includes a processing module 1202 and an interface module 1201. Optionally, the processing module may further include a storage module 1203. The processing module 1202, the interface module 1201, and the storage module 1203 are coupled or connected to each other, and may transmit a control signal and/or a data signal to each other. The storage module 1203 is configured to store a computer program. The processing module 1202 is configured to invoke the computer program from the storage module 1203 and run the computer program, to implement the foregoing method 500, 600, or 700. It should be understood that the processing apparatus 1200 shown in the figure is merely an example. During specific implementation, the storage module 1203 may alternatively be integrated into the processing module 1202, or may be independent of the processing module 1202. This is not limited in the present disclosure.

FIG. 13 is a schematic diagram of a structure of a terminal device 2000 according to an embodiment of the present disclosure. The terminal device can perform a method provided in embodiments of the present disclosure. As shown in the figure, the terminal device 3000 includes a transceiver 2100, an application processor 2200, a memory 2300, and a baseband processor 2400.

The transceiver 2100 may adjust (for example, perform analog conversion, filtering, amplification, and up-conversion on) an output sample and generate an uplink signal. The uplink signal is transmitted to the base station in the foregoing embodiments by using an antenna. In a downlink, the antenna receives a downlink signal transmitted by an access network device. The transceiver 2100 may adjust (for example, perform filtering, amplification, down-conversion, and digitization on) a signal received from the antenna and provide an input sample. Specifically, the transceiver 2100 may be implemented by a radio frequency chip.

The baseband processor 2400 may also be referred to as a baseband chip. The baseband processor processes a received digitalized signal to extract information or a data bit transmitted in the signal. In a possible design, the baseband processor 2400 may include an encoder, a modulator, a decoder, and a demodulator. The encoder is configured to encode a to-be-sent signal. For example, the encoder may be configured to receive service data and/or a signaling message to be sent on an uplink, and perform processing (for example, formatting, encoding, or interleaving) on the service data and the signaling message. The modulator is configured to modulate an output signal of the encoder. For example, the modulator may perform processing such as symbol mapping and/or modulation on the output signal (data and/or signaling) of the encoder, and provide an output sample. The demodulator is configured to demodulate an input signal. For example, the demodulator processes an input sample and provides symbol estimation. The decoder is configured to decode the demodulated input signal. For example, the decoder performs processing such as de-interleaving and/or decoding on the demodulated input signal, and outputs a decoded signal (data and/or signaling). The encoder, the modulator, the demodulator, and the decoder may be implemented by a combined modem processor. The units perform processing based on a radio access technology used in a radio access network. Optionally, the baseband processor 2400 may include a memory.

The baseband processor 2400 may receive, from the application processor 2200, digitalized data that may represent voice, data, or control information, and process the digitalized data for transmission. The modem processor may support one or more of a plurality of wireless communication protocols of a plurality of communication systems, for example, LTE, new radio NR, universal mobile telecommunications system (UMTS), and high-speed packet access (HSPA). Optionally, the baseband processor 2400 may include one or more memories.

Optionally, the baseband processor 2400 and the application processor 2200 may be integrated into one processor chip.

The memory 2300 is configured to store program code (sometimes also referred to as a program, instructions, software, or the like) and/or data for supporting the terminal device in communicating.

It should be noted that the memory 2300 or the memory in the baseband processor 2400 may include one or more storage units, for example, may be a storage unit inside the baseband processor 2400 or the application processor 2200, may be an external storage unit independent of the application processor 2200 or the baseband processor 2400, or may be a component including a storage unit inside the application processor 2200 or the baseband processor 2400 and an external storage unit independent of the application processor 2200 or the baseband processor 2400.

The baseband processor 2400 may include a CPU, a general-purpose processor, a digital signal processor (DSP), an application-specific integrated circuit (ASIC), a field programmable gate array (FPGA) or another programmable logic device, a transistor logic device, a hardware component, another integrated circuit, or any combination thereof. The baseband processor 2400 may implement or execute various example logical blocks, modules, and circuits described with reference to content disclosed in embodiments of the present disclosure. Alternatively, the baseband processor 2400 may be a combination of components that implement a computing function, for example, a combination of one or more microprocessors, a combination of a DSP and a microprocessor, or a system-on-a-chip (SOC).

It should be understood that the terminal device 2000 shown in FIG. 13 can implement the processes in the foregoing method embodiments. Operations or functions of modules in the terminal device 2000 are separately intended to implement corresponding processes in the foregoing method embodiments. For details, refer to the descriptions in the foregoing method embodiments. To avoid repetition, detailed descriptions are properly omitted herein.

FIG. 14 is a schematic diagram of a structure of a network device 3000 which may be, for example, a base station according to an embodiment of the present disclosure. The network device 3000 may be applied to the system or the communication scenario shown in FIG. 1 or FIG. 2, to perform a method provided in embodiments of the present disclosure. As shown in the figure, the network device 3000 may include one or more transceiver units (also referred to as communication units) 3100 and one or more baseband units 3200. The transceiver unit 3100 may correspond to the transceiver module 1100 in FIG. 11. Optionally, the transceiver unit 3100 may include at least one antenna 3101 and a radio frequency unit 3102. Optionally, the transceiver unit 3100 may include a receiving unit and a sending unit. The receiving unit may correspond to a receiver (or referred to as a receiver circuit), and the sending unit may correspond to a transmitter (or referred to as a transmitter circuit). The transceiver unit 3100 is mainly configured to receive and send a radio frequency signal and perform conversion between the radio frequency signal and a baseband signal. The baseband unit 3200 is mainly configured to perform baseband processing, control a base station, and the like. The transceiver unit 3100 and the baseband unit 3200 may be physically disposed together, or may be physically separated, that is, a distributed base station.

The baseband unit 3200 is a control center of the network device, and may also be referred to as a processing unit, may correspond to the processing module 1200 in FIG. 11, and is mainly configured to implement a baseband processing function, for example, channel coding, multiplexing, modulation, or spreading. For example, the baseband unit 3200 may be configured to control the base station to execute an operation process related to the network device in the foregoing method embodiments.

In an example, the baseband unit 3200 may include one or more boards, and a plurality of boards may jointly support a radio access network (such as an LTE network) of a single access standard, or may separately support radio access networks (such as an LTE network, a 5G network, or another network) of different access standards. The baseband unit 3200 further includes a memory 3201 and a processor 3202. The memory 3201 is configured to store necessary instructions and data. The processor 3202 is configured to control the base station to perform a necessary action, for example, is configured to control the base station to perform the operation process related to the network device in the foregoing method embodiment. The memory 3201 and the processor 3202 may serve one or more boards. In other words, a memory and a processor may be disposed on each board. Alternatively, a plurality of boards may share a same memory and a same processor. In addition, a necessary circuit may further be disposed on each board.

It should be understood that the network device 3000 shown in FIG. 14 can implement the processes in the foregoing method embodiments. Operations or functions of modules in the network device 3000 are separately intended to implement corresponding processes of the method provided in embodiments of the present disclosure. For details, refer to the descriptions in the foregoing method embodiments. To avoid repetition, detailed descriptions are properly omitted herein.

The memory described in embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that the memory of the systems and methods described in this specification includes but is not limited to these and any memory of another proper type.

The present disclosure further provides a computer program product. The computer program product includes computer program code. When the computer program code is run on a computer, the computer is enabled to perform the method in any one of the foregoing method embodiments.

The present disclosure further provides a computer-readable medium. The computer-readable medium stores program code, and when the program code is run on a computer, the computer is enabled to perform the methods in the foregoing method embodiments.

All or some of the foregoing embodiments may be implemented by using software, hardware, firmware, or any combination thereof. When software is to implement the embodiments, all or a part of the embodiments may be implemented in a form of a computer program product. The computer program product includes one or more computer instructions. When the computer instructions are loaded and executed on the computer, the process or functions based on embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid-state drive (SSD)), or the like.

It should be understood that, in the present disclosure, both "when" and "if" mean that a network element performs corresponding processing in an objective situation, but do not constitute any limitation on time, do not require the network element to necessarily perform a determining action during implementation, and do not mean other limitations.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely exemplary implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A resource determining method, comprising:

determining, based on at least two resource reservation period parameters $\{P'_1, P'_2, \ldots, P'_T\}$, a sensing time unit set corresponding to a candidate time unit ($t_y$), wherein the sensing time unit set comprises:

$$\{\{t_{y-1\times P'_1}, t_{y-2\times P'_1}, \ldots, t_{y-M\times P'_1}\}, \{t_{y-1\times P'_2}, t_{y-2\times P'_2}, \ldots, t_{y-M\times P'_2}\}, \ldots, \{t_{y-1\times P'_T}, t_{y-2\times P'_T}, \ldots, t_{y-M\times P'_T}\}\},$$

wherein T is a positive integer greater than or equal to 2, M is a positive integer greater than or equal to 2, the candidate time unit ($t_y$) is located in a resource selection window; and excluding, based on a sensing result in the sensing time unit set, an unavailable candidate resource unit in the candidate time unit ($t_y$).

2. The method according to claim 1, further comprises:

receiving first configuration signaling, wherein the first configuration signaling indicates configuration information of M.

3. The method according to claim 1, further comprising:

converting at least two resource reservation period intervals $\{P_1, P_2, \ldots, P_T\}$ to obtain the at least two resource reservation period parameters $$\{P'_1, P'_2, \ldots, P'_T\}.$$

4. The method according to claim 3, further comprising:

receiving second configuration signaling, wherein the second configuration signaling indicates the at least two resource reservation period intervals $\{P_1, P_2, \ldots, P_T\}$.

5. The method according to claim 4, wherein the second configuration signaling further comprises configuration information of a sidelink resource pool, and wherein the resource selection window, the sensing time unit set belong to the sidelink resource pool.

6. The method according to claim 4, wherein the second configuration signaling is a system information block (SIB), radio resource control (RRC) signaling, or physical layer control information.

7. The method according to claim 1, wherein M is equal to 2, the sensing time unit set comprises $$\{\{t_{y-1\times P'_i}, t_{y-2\times P'_i}\}\}, P'_i$$

is a resource reservation period parameter of the at least two resource reservation period parameters, and i=1, 2, . . . , T.

8. The method according to claim 1, wherein M is determined based on one or more values of the at least one resource reservation period parameter $$\{P'_1, P'_2, \ldots, P'_T\}.$$

9. A communication apparatus, comprising:

at least one processor; and one or more memories coupled to the at least one processor and storing instructions, wherein the instructions, when executed by the at least one processor, cause the apparatus to:

determine, based on at least two resource reservation period parameters $$\{P'_1, P'_2, \ldots, P'_T\}.$$

a sensing time unit set corresponding to a candidate time unit ($t_y$), wherein the sensing time unit set comprises:

$$\{\{t_{y-1\times P'_1}, t_{y-2\times P'_1}, \ldots, t_{y-M\times P'_1}\}, \{t_{y-1\times P'_2}, t_{y-2\times P'_2}, \ldots, t_{y-M\times P'_2}\}, \ldots, \{t_{y-1\times P'_T}, t_{y-2\times P'_T}, \ldots, t_{y-M\times P'_T}\}\},$$

wherein T is a positive integer greater than or equal to 2, M is a positive integer greater than or equal to 2, the candidate time unit ($t_y$) is located in a resource selection window; and exclude, based on a sensing result in the sensing time unit set, an unavailable candidate resource unit in the candidate time unit ($t_y$).

10. The apparatus according to claim 9, wherein the instructions, when executed by the at least one processor, further cause the apparatus to:

receive first configuration signaling, wherein the first configuration signaling indicates configuration information of M.

11. The apparatus according to claim 9, wherein the instructions, when executed by the at least one processor, further cause the apparatus to:

receive second configuration signaling, wherein the second configuration signaling indicates the at least two resource reservation period intervals $\{P_1, P_2, \ldots, P_T\}$; and convert at least two resource reservation period intervals $\{P_1, P_2, \ldots, P_T\}$ to obtain the at least two resource reservation period parameters $$\{P'_1, P'_2, \ldots, P'_T\}.$$

12. The apparatus according to claim 11, wherein the second configuration signaling further comprises configuration information of a sidelink resource pool, and wherein the resource selection window, the sensing time unit set belong to the sidelink resource pool.

13. The apparatus according to claim 11, wherein the second configuration signaling is a system information block (SIB), radio resource control (RRC) signaling, or physical layer control information.

14. The apparatus according to claim 2, wherein M is equal to 2, the sensing time unit set comprises $$\{\{t_{y-1\times P_i'}, t_{y-2\times P_i'}\}\}, P_i'$$

is a resource reservation period parameter of the at least two resource reservation period parameters, and i=1, 2, . . . , T.

15. A non-transitory computer-readable storage medium, comprising executable instructions, wherein the executable instructions, when executed by a processor, cause the processor to:

determine, based on at least two resource reservation period parameters $$\{P_1', P_2', \ldots, P_T'\},$$

a sensing time unit set corresponding to a candidate time unit ($t_y$), wherein the sensing time unit set comprises:

$$\{\{t_{y-1\times P_1'}, t_{y-2\times P_1'}, \ldots, t_{y-M\times P_1'}\}, \{t_{y-1\times P_2'}, t_{y-2\times P_2'}, \ldots, t_{y-M\times P_2'}\}, \ldots, \{t_{y-1\times P_T'}, t_{y-2\times P_T'}, \ldots, t_{y-M\times P_T'}\}\},$$

wherein T is a positive integer greater than or equal to 2, M is a positive integer greater than or equal to 2, the candidate time unit ($t_y$) is located in a resource selection window; and exclude, based on a sensing result in the sensing time unit set, an unavailable candidate resource unit in the candidate time unit ($t_y$).

16. The non-transitory computer-readable storage medium according to claim 15, wherein the instructions, when executed by the computer, further cause the computer to:

receive first configuration signaling, wherein the first configuration signaling indicates configuration information of M.

17. The non-transitory computer-readable storage medium according to claim 15, wherein the instructions, when executed by the computer, further cause the computer to:

receive second configuration signaling, wherein the second configuration signaling indicates the at least two resource reservation period intervals $\{P_1, P_2, \ldots, P_T\}$; and convert at least two resource reservation period intervals $\{P_1, P_2, \ldots, P_T\}$ to obtain the at least two resource reservation period parameters $$\{P_1', P_2', \ldots, P_T'\}.$$

18. The non-transitory computer-readable storage medium according to claim 17, wherein the second configuration signaling further comprises configuration information of a sidelink resource pool, and wherein the resource selection window, the sensing time unit set belong to the sidelink resource pool.

19. The non-transitory computer-readable storage medium according to claim 17, wherein the second configuration signaling is a system information block (SIB), radio resource control (RRC) signaling, or physical layer control information.

20. The non-transitory computer-readable storage medium according to claim 15, wherein M is equal to 2, the sensing time unit set comprises $$\{\{t_{y-1\times P_i'}, t_{y-2\times P_i'}\}\}, P_i'$$

is a resource reservation period parameter of the at least two resource reservation period parameters, and i=1, 2, . . . , T.

* * * * *